(12) United States Patent
Mine et al.

(10) Patent No.: US 6,208,927 B1
(45) Date of Patent: Mar. 27, 2001

(54) VEHICLE MANEUVERING CONTROL DEVICE

(75) Inventors: Atsushi Mine, Ashikaga; Koji Matsuno, Gunma-Ken, both of (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,194

(22) Filed: Sep. 9, 1998

(30) Foreign Application Priority Data

Sep. 10, 1997 (JP) .................................................. 9-245788

(51) Int. Cl.[7] .................................................. B60T 7/12
(52) U.S. Cl. .................................. 701/70; 701/72; 701/75; 701/79
(58) Field of Search ................................. 701/70, 72, 75, 701/79, 23, 25, 96, 97, 80

(56) References Cited

U.S. PATENT DOCUMENTS

| | | | | |
|---|---|---|---|---|
| 5,315,295 | * | 5/1994 | Fujii | 340/936 |
| 5,388,046 | * | 2/1995 | Anan et al. | 364/424.05 |
| 5,539,397 | * | 7/1996 | Asanuma et al. | 340/901 |
| 5,742,240 | * | 4/1998 | Asanuma et al. | 340/995 |
| 5,757,949 | * | 5/1998 | Kinoshita et al. | 382/104 |

FOREIGN PATENT DOCUMENTS 10 269499 * 10/1998 (JP) .

* cited by examiner

Primary Examiner—William A. Cuchlinski, Jr.
Assistant Examiner—Marthe Marc-Coleman
(74) Attorney, Agent, or Firm—Smith, Gambrell & Russell, LLP

(57) ABSTRACT

A vehicle maneuvering control device is disclosed. A curve of a road is detected to calculate curve data including a distance between a vehicle and the curve, and a physical quantity indicating a degree of the curve. An allowable deceleration is set at which the vehicle can travel in accordance with conditions of the road. An allowable lateral acceleration is set at which the vehicle can travel in accordance with the conditions of the road. An allowable approaching speed is set at which the vehicle can approaches the curve based on the physical quantity and the lateral acceleration. A deceleration judging speed is calculated for judging whether a present speed at which the vehicle is traveling should be decreased based on the distance, the allowable deceleration and the allowable approaching speed. And, the present speed is decreased when it is higher than the deceleration judging speed.

17 Claims, 13 Drawing Sheets

| $P_n$ | DISTANCE FROM REFERENCE NODE (m) | DISTANCE FROM PRECEDING NODE $L_n$(m) | RADIUS OF CURVATURE $R_n$(m) | SIGN $R_{n-1} \cdot R_n$ | $\|R_{n-1}\| - \|R_n\|$ (m) | SIGN $L_n - (\|R_{n-1}\| - \|R_n\|)$ | ADAPTABLE CASE ($P_{n-1}$ TO $P_n$) | TOTAL CURVE ANGLE $\theta_s$ (°) |
|---|---|---|---|---|---|---|---|---|
| 1 | 23.8 | | +68.1 | | | | | |
| 2 | 45.9 | 22.1 | +32.3 | + | +35.8 | − | 2 $P_1$ NEGLECTED | → |
| 3 | 67.2 | 21.3 | +41.3 | + | −9.0 | | 3 $P_3$ NEGLECTED | → |
| 4 | 100.6 | 33.4 | +45.5 | + | −4.2 | | 3 $P_4$ NEGLECTED | → |
| 5 | 127.2 | 26.6 | +33.6 | + | +11.9 | + | 1 $P_4$ $P_5$ NEEDED | −175.6 |
| 6 | 160.3 | 33.1 | +97.6 | + | −64.0 | | 3 $P_6$ NEGLECTED | → |
| 7 | 187.7 | 27.4 | −115.6 | − | | | 4 $P_7$ NEEDED | → |
| 8 | 204.9 | 17.2 | −14.1 | + | +101.5 | − | 2 $P_7$ NEGLECTED | −106.5 |
| 9 | 218.2 | 13.3 | −15.1 | + | −1.0 | | 3 $P_9$ NEGLECTED | → |
| 10 | 257.4 | 39.2 | +104.9 | − | | | 4 $P_{10}$ NEEDED | → |
| 11 | 285.2 | 27.8 | +24.1 | + | +80.8 | − | 2 $P_{10}$ NEGLECTED | → |
| 12 | 301.6 | 16.4 | +31.1 | + | −7.0 | | 3 $P_{12}$ NEGLECTED | +82.6 |
| 13 | 327.4 | 25.8 | −48.1 | − | | | 4 $P_{13}$ NEEDED | −98.6 |
| 14 | 348.1 | 20.7 | −20.8 | + | +27.3 | − | 2 $P_{13}$ NEGLECTED | → |
| 15 | 379.7 | 31.6 | −96.6 | + | −75.8 | | 3 $P_{15}$ NEGLECTED | |

FIG.10

VEHICLE MANEUVERING CONTROL DEVICE

BACKGROUND OF THE INVENTION

This invention relates to a vehicle maneuvering control device which can control a running vehicle at a proper speed on a curved road.

Recently such vehicle maneuvering control devices have been developed as follows: On a vehicle, a navigator or the like is installed. A radius of curvature of a curve emerging ahead of the driver is calculated based on the processed map information obtained from the navigator. Based on, for example, the detected radius of curvature and the vehicle speed, the warning/deceleration control is made while judging whether the vehicle can corner the upcoming curve or not.

For example, the Japanese Patent Laid-open No. 194886/1996 discloses a control device responsive to the upcoming road condition. In this device, emerging curves are detected based on information from a navigator. When a curve is detected, the device takes into account both the curvature and vehicle speed, and judges whether the present vehicle speed will be too high when entering the corner. If the speed is too high, a warning is set off, or the running condition of the vehicle is adjusted.

The judgment according to the prior art is made as follows: A corrected value based on vehicle speed is added to a predefined target lateral acceleration based on steering angle and the vehicle speed, to obtain an allowable lateral acceleration for approaching the curve. An allowable approaching speed is calculated based on the obtained allowable lateral acceleration and the radius of curvature. When comparison between the present speed and the obtained allowable approaching speed reveals that the present speed is higher than the allowable approaching speed, judgment is made that the present speed is too high.

In general, when road slope, road surface friction coefficient or other road conditions change, the braking distance and the critical cornering performance of vehicles may change even when the same braking force is applied. Accordingly, the setting of the allowable approaching speed, i.e., a referential judgment value for a vehicle under cornering must be made taking fully account of these factors.

According to the prior art, however, when setting the allowable approaching speed, road slope, road surface friction coefficient and other road conditions are not fully taken into account, so that in a variety of actual running roads, it is difficult to make adjustments in perfect in accordance with the conditions of the road being traveled on.

Furthermore, even when the vehicle speed exceeds the critical speed at which the vehicle can turn the corner, its criticality varies with the distance remaining before entering the corner. The longer the remaining distance, the easier it is to decelerate the vehicle down to the critical speed, but the shorter the distance, the more rapidly the deceleration must be performed.

In the foregoing prior art, however, the device makes judgment by comparing the vehicle speed (the present speed) and the allowable approaching speed under the assumption that the vehicle will continue traveling at the present speed until it reaches the starting point of the emerging curve from the warning set-off point which has been defined as a given distance (depending upon the present vehicle speed) ahead of the curve staring point. Accordingly, to make a more practical and reliable control, the distance up to the curve starting point should be taken into account.

SUMMARY OF THE INVENTION

The present invention provides a vehicle maneuvering control device which can make an optimum control in accordance with the actual road conditions, and provides a practical, reliable and stabilized control with taking into account the effects stemming from the distance to the curve.

The present invention provides a vehicle maneuvering control device comprising: curve detection means for detecting a curve of a road and calculating curve data including a distance between a vehicle and the curve, and a physical quantity indicating a degree of the curve; allowable deceleration setting means for setting an allowable deceleration at which the vehicle can travel in accordance with conditions of the road; allowable lateral acceleration setting means for setting an allowable lateral acceleration at which the vehicle can travel in accordance with the conditions of the road; allowable approaching speed setting means for setting an allowable approaching speed at which the vehicle can approaches the curve based on the physical quantity and the allowable lateral acceleration; warning judging speed calculating means for calculating a warning judging speed for judging whether a warning should be given to a driver based on the distance, the allowable deceleration speed and the allowable approaching speed; warning means for warning the driver when the present speed is higher than the warning judging speed; deceleration judging speed calculating means for calculating a deceleration judging speed for judging whether a present speed at which the vehicle is traveling should be decreased based on the distance, the allowable deceleration speed and the allowable approaching speed; and decreasing means for decreasing the present speed when the present speed is higher than the deceleration judging speed.

Furthermore, the present invention provides a vehicle maneuvering control device comprising: curve detection means for detecting a curve of a road and calculating curve data including a distance between a vehicle and the curve, and a physical quantity indicating a degree of the curve; allowable deceleration setting means for setting an allowable deceleration at which the vehicle can travel in accordance with conditions of the road; allowable lateral acceleration setting means for setting an allowable lateral acceleration at which the vehicle can travel in accordance with the conditions of the road; allowable approaching speed setting means for setting an allowable approaching speed at which the vehicle can approaches the curve based on the physical quantity and the allowable lateral acceleration; deceleration judging speed calculating means for calculating a deceleration judging speed for judging whether a present speed at which the vehicle is traveling should be decreased based on the distance, the allowable deceleration speed and the allowable approaching speed; and decreasing means for decreasing the present speed when the present speed is higher than the deceleration judging speed.

Furthermore, the present invention provides a vehicle maneuvering control device comprising: curve detection means for detecting a curve of a road and calculating curve data including a distance between a vehicle and the curve, and a physical quantity indicating a degree of the curve; allowable deceleration setting means for setting an allowable deceleration at which the vehicle can travel in accordance with conditions of the road; allowable lateral acceleration setting means for setting an allowable lateral acceleration at which the vehicle can travel in accordance with the conditions of the road; allowable approaching speed setting means for setting an allowable approaching speed at which the vehicle can approaches the curve based on the physical quantity and the allowable lateral acceleration; warning judging speed calculating means for calculating a warning judging speed for judging whether a warning should be given to a driver based on the distance, the allowable deceleration speed and the allowable approaching speed; and warning means for warning the driver when the present speed is higher than the warning judging speed.

BRIEF DESCRIPTION OF DRAWINGS

FIG. 10 is a table showing trial results of data reduction;

DETAILED DESCRIPTION OF PREFERRED EMBODIMENTS

Figure 1:
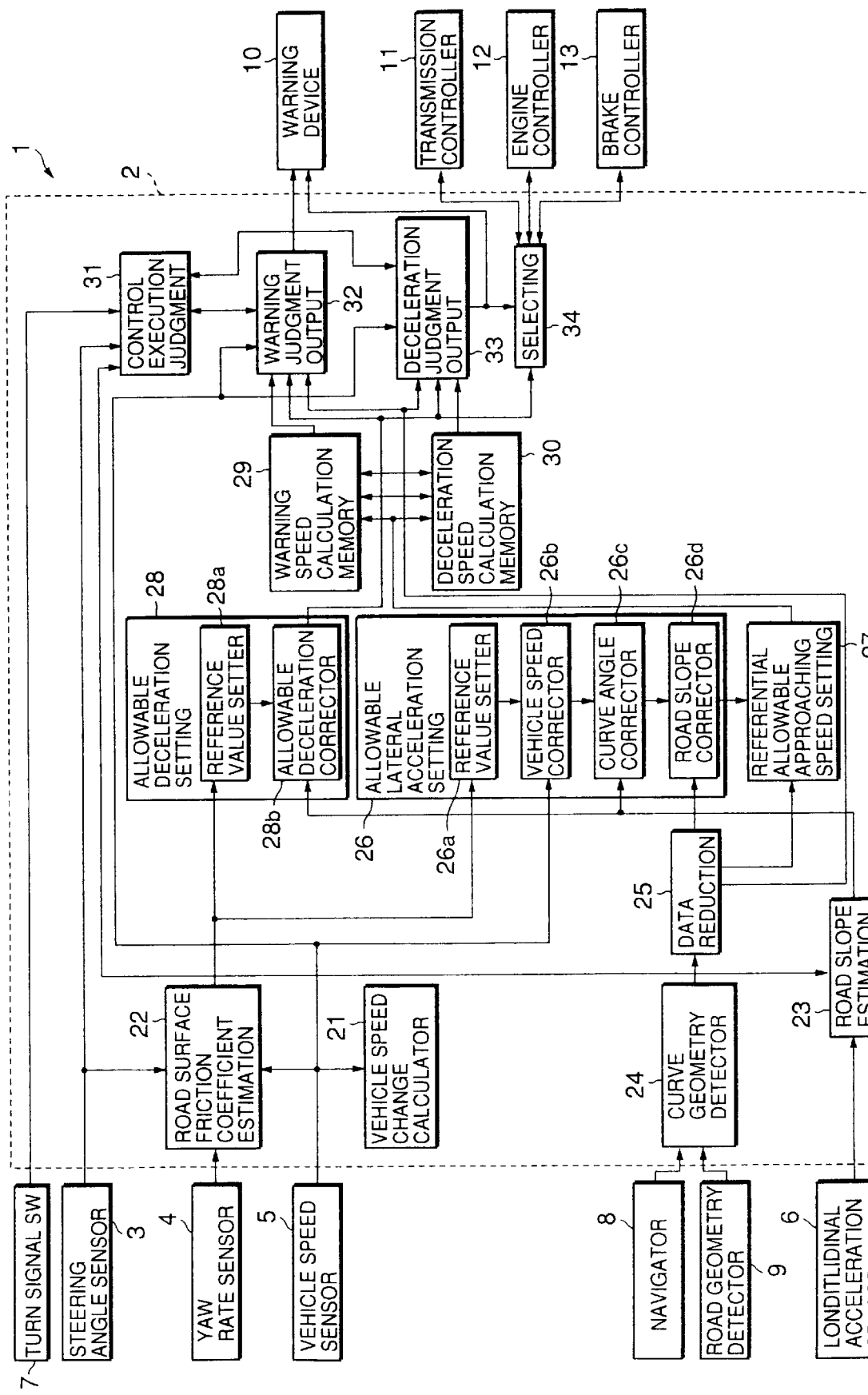
FIG. 1 is a block diagram showing the overall configuration of a vehicle maneuvering control device according to the present invention.

A detailed description will be made for preferred embodiments of the vehicle maneuvering control device according to the present invention as follows, referring to the attached drawings:

In FIG. 1, a controller 2 of a vehicle maneuvering control device to be installed on a vehicle receives signals related to steering angle, yaw rate, vehicle speed, and longitudinal acceleration as detected by a steering wheel angle sensor 3, yaw rate sensor 4, vehicle speed sensor 5, and longitudinal acceleration sensor 6, respectively. A signal of a turn signal switch 7 is also input to the controller 2, so as to detect turning operations of the driver (going straight, right turn, left turn). A wheel speed sensor 5 may be substitute for the vehicle speed sensor.

A navigator 8 is connected to the controller 2. The navigator 8 provides to the controller 2 such information as point data in map information representing the location and geometry of the road; and road type information, such as highways, ordinary national roads and local roads. The width of the road may be input to the controller 2 as map information from the navigator 8.

Furthermore, a road geometry detector 9 is connected to the controller 2, and detects road width and other data related to road geometry.

Based on the inputs from the sensors 3, 4, 5 and 6, as well as from the turn signal switch 7, the navigator 8 and the road geometry detector 9, the controller 2 determines whether the vehicle can turn an approaching curve in a stable manner. If required, the controller 2 will warn the driver through a warning device 10, such as, a buzzer, voice warning generator, and warning lamp. Furthermore, if an enforced deceleration is required, the controller 2 will not only set off warning, but also activate a transmission controller 11 to shift the gears down, an engine controller 12 to reduce excessive oil pressure, fuel cut, and throttle full closing (closing control), a brake controller 13 to apply the brakes and increase the braking force.

Figure 2:
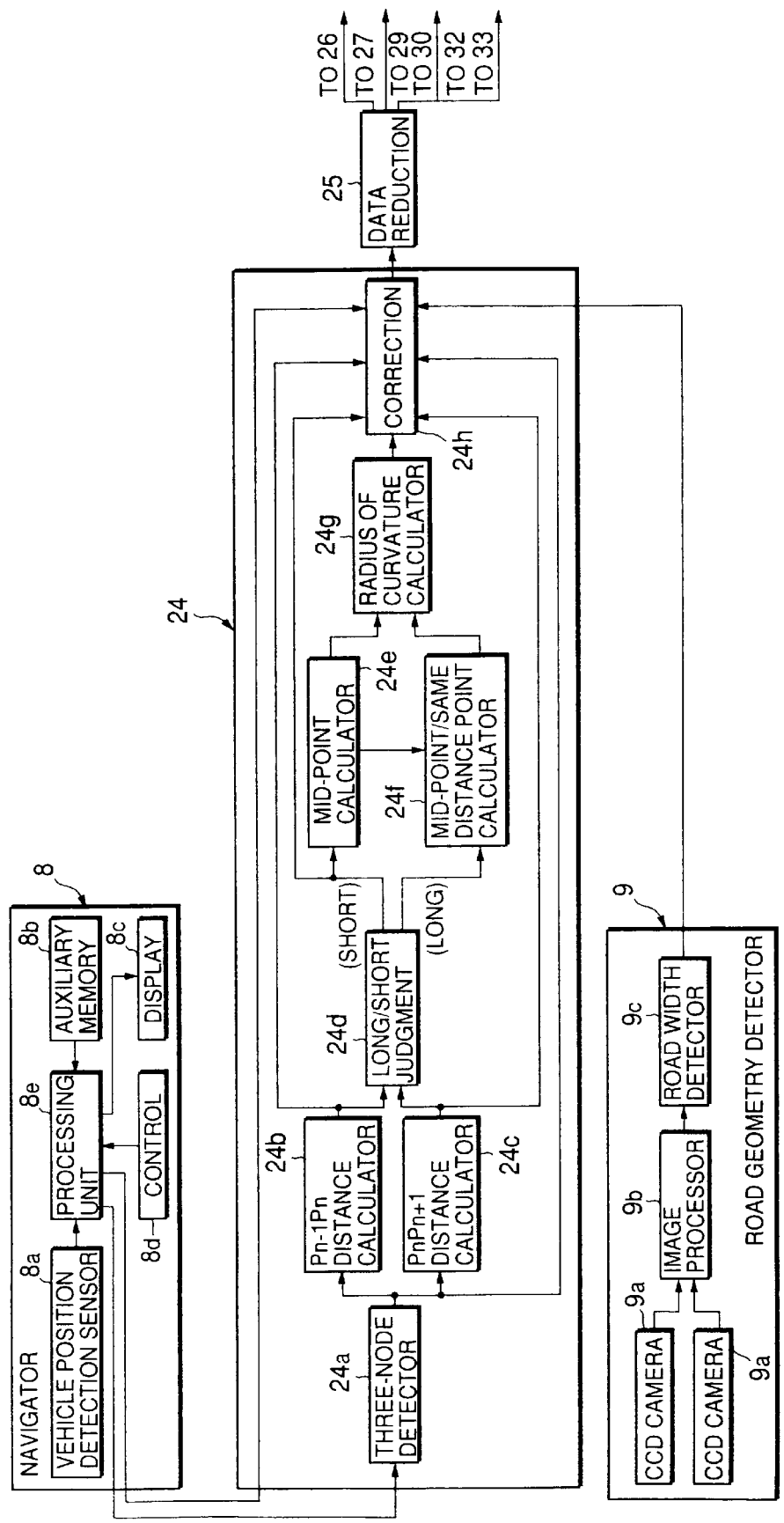
FIG. 2 is a block diagram showing a configuration of the curve geometry detector.

In general, as shown in FIG. 2, the navigator 8 consists mainly of a vehicle position detection sensor 8a, an auxiliary memory 8b, a display 8c, a control section 8d, and a processing unit 8e.

The vehicle position detection sensor 8a gathers running information related to vehicle position. The sensor 8a consists mainly of a GPS (Global Positioning System) receiver to receive positioning signals from GPS satellites so as to determine the position of the vehicle; a magnetic sensor to detect the absolute running direction of the vehicle; and a wheel speed sensor composed of an electromagnetic pickup facing an outer periphery of a rotor fixed to the wheel to output a pulse signal when it crosses projections on the outer peripheral of the rotor.

Figure 5:
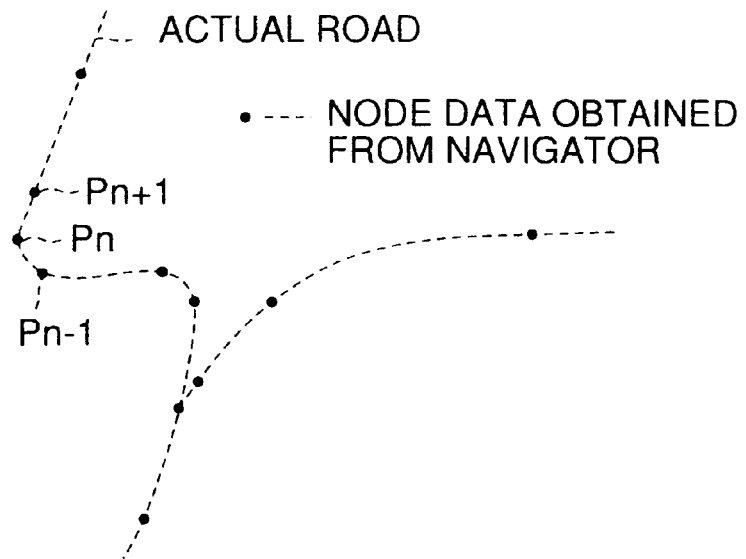
FIG. 5 is an illustration showing examples of point data actually obtained from a navigator.

The auxiliary memory 8b is a CD-ROM device, containing a CD-ROM storing road information, topographical information and other road map information. The CD-ROM stores road map information at several hierarchical levels of varying scales as well as road type information such as highways, ordinary national roads, and local roads, and passage conditions information of intersections. As shown in FIG. 5, the road data included in the road map information consists of point data (nodes) input at given intervals of space and line data (link) formed by connecting these nodes.

The display 8c is a liquid crystal display which displays maps, the vehicle position (the latitude, longitude and altitude), orientation, the position of vehicle on the map, and the optimum routing up to the destination. A touch panel as the control section 8d is integrated within the display 8c (liquid crystal display), making it possible to change displaying of the map scale, detailed display of place names, and displays of area information and route guidance.

The processing unit 8e combines the vehicle running information obtained from the vehicle position detection sensor 8a and the map information read from the auxiliary memory 8b, while making map matching and other processing. The results are fed to the display 8c based on an operating signal sent from the control section 8d, so as to display the present position of the vehicle, its peripheral map, the optimum route to the destination and other information. The node data of the road data and the information on node types are output to the controller 2 as required.

According to this embodiment, an important function of the road geometry detector 9 is to detect road width. The detector 9 consists mainly of a pair of CCD cameras 9a, an image processor 9b and a road width detector 9c.

The pair of CCD cameras 9a are installed at the right and left sides of the front of the vehicle ceiling at a fixed distance, so as to image the objects outside of the vehicle from different view points. Signals of the passing images taken by the CCD cameras 9a are output to the image processor 9b.

A pair of stereo images taken by the CCD cameras 9a are fed to the image processor 9b that determines distance information over the entire image filed by way of trigonometric calculations according to the deviations of the positions of objects in each image, so as to generate a distance image showing distance distribution in 3-D. The generated 3D-distance image is output to the road width detector 9c.

The road width detector 9c first recognizes the road being traveled on by providing a histogram processing of the distance distributions of the distance images sent from the image processor 9b. The road width thus calculated is then output to the controller 2 as required.

The road width detector 9c approximates, for example, lane-dividing lines as broken lines, and judges the area between the left and right broken lines as the traffic lane for the vehicle. The road width is calculated from the distance between the left and right broken lines of the traffic lane. The road geometry detector 9 detects road geometry to determine the road width and compares the obtained road geometry with the map road geometry data in the navigator 8, and corrects the vehicle position on the map, thereby allowing a more accurate positioning of the vehicle.

The warning device 10 is a warning means which consists of a chime, buzzer, voice warning generator, warning lamp or combination of these. For example, during warning set-off time, either such a voice warning as "Slow down for the approaching curve" previously recorded in the CD-ROM in the navigator 8 or a buzzer warning is taken, and during enforced deceleration time, the voice warning, the buzzer warning and lighting of the warning lamp are combined. There may be other warning systems, such as selection of two or more voice warnings for just warning time and enforced deceleration time. Color display on the map or voice annunciation may be used for more clearly teaching the driver about the position of the curve for which warning/deceleration control should be taken.

The transmission controller 11 (deceleration means) makes transmission-related controls such as gear change, lockup of torque converter, and line pressure. The transmission controller 11 not only outputs the present gear position to the controller 2, but also makes gear shift-down operation on receiving a signal for commanding a shift-down from the controller 2.

The engine controller 12 (deceleration means) makes such engine related controls as fuel injection, ignition timing, supercharging pressure, and throttle opening. The engine controller 12 not only outputs to the controller 2 supercharging pressure control information, fuel cut information, and throttle opening control information, but also makes supercharging pressure down, fuel cut or throttle full closing operation (closing control) when receiving, respectively, a signal for executing the supercharging pressure down, fuel cut or the throttle full closing (closing control) from the controller 2.

The brake controller 13 (deceleration means) is connected to a hydraulic unit to make an anti-lock brake control and an automatic brake control. The brake controller 13 not only outputs the present brake activation condition to the controller 2, but also, receiving a command signal for brake activation or brake force increase, executes brake activation or brake force increasing.

The controller 2 comprises a vehicle speed change calculator 21, a road surface friction coefficient estimation section 22, a road slope estimation section 23, a curve geometry detector 24, a data reduction section 25, an allowable lateral acceleration setting section 26, a referential allowable approaching speed setting section 27, an allowable deceleration setting section 28, a warning speed calculation/memory section 29, a speed calculation/memory section 30, a control execution determination section 31, a warning judgment output section 32, a deceleration judgment output section 33 and a selection section 34.

The above vehicle speed change calculator 21 calculates a change rate of vehicle speed for each setting time based on the vehicle speed output from the vehicle sensor 5. The calculation results are output to the road slope estimation section 23 and the control execution determination section 31.

The road surface friction coefficient estimation section 22 estimates road surface friction coefficient $\mu$ using, e.g., the method disclosed by the applicant of the present invention in the Japanese Patent Laid-open No. 2274/1996, based on the vehicle speed V from the vehicle speed sensor 5, the steering angle $\delta f$ from the steering wheel angle sensor 3 and the yaw rate $\gamma$ from the yaw rate sensor 4. The estimated road surface friction coefficient $\mu$ is output to the allowable lateral acceleration setting section 26 and the allowable deceleration setting section 28.

A change rate $\Delta\mu$ of the estimated road surface friction coefficient $\mu$ is calculated. If the change rate A $\Delta\mu$ is larger than a given value, an allowable deceleration XgLim, an allowable lateral acceleration ayln, a referential allowable approaching speed Vpn, a warning speed VA, and a deceleration speed VB (each to be described later) are recalculated before starting the control.

Figure 6:
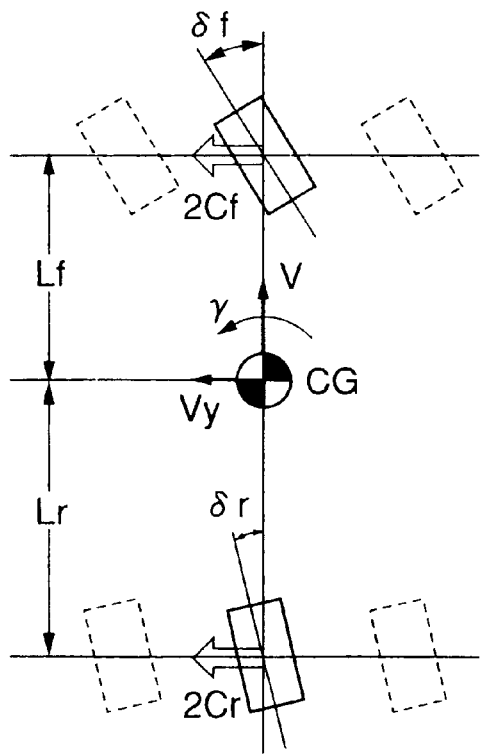
FIG. 6 is an illustration showing vehicle's two-wheel model under lateral motion.

The estimation method of the road surface friction coefficient $\mu$ according to the invention compares a yaw rate response based on the equation for the vehicle's motion and an actual yaw rate so as to estimate online the coefficient while taking the equivalent cornering power of tire as unknown parameter. In detail, the road surface friction coefficient $\mu$ is calculated by the parameter adjustment law according to the following adaptive control theory:

Using the vehicle motion or maneuvering model shown in FIG. 6, an equation for the vehicle's lateral motion is established. An equation of motion for lateral translation is as follows:

$$2 \cdot Cf + 2 \cdot Lf - 2 \cdot Cr = M \cdot Gy \qquad (1)$$

where Cf and Cr are the cornering forces of front and rear wheels, respectively, M is the body mass, and Gy is the lateral acceleration.

On the other hand, an equation for rotational motion around gravity center is as follows:

$$2 \cdot Cf \cdot Lf - 2 \cdot Cr \cdot Lr = Iz \cdot (d\gamma/dt) \qquad (2)$$

where Lf and Lr are the distance from gravity center to longitudinal wheel axles, Iz is the yawing inertial moment of the body, and $d\gamma/dt$ is yaw angular acceleration. Using vehicle speed V and the lateral translation speed (side slip speed) Vy of gravity center, the lateral acceleration Gy can be transformed into the following expression (3):

$$Gy = (dVy/dt) + V \cdot \gamma \qquad (3)$$

Actually, the cornering force may make a response essentially like a first-order lag for the side slip angle of tires, but if this lag may is neglected, thus obtaining the following expressions (4) and (5):

$$Cf = Kf \cdot \alpha f \quad (4)$$

$$Cr = Kr \cdot \alpha r \quad (5)$$

where Kf and Kr are the cornering powers of longitudinal wheels, respectively, $\alpha f$ and $\alpha r$ are the side slip angles of them.

Using equivalent cornering powers in consideration of the influence of roll and suspension on the cornering powers, the side slip angles $\alpha f$ and $\alpha r$ are simplified as follows (expressions (6) and (7)):

$$\alpha f = (\delta f/n) - ((Vy + Lf \cdot \gamma)/V) \quad (6)$$

$$\alpha r = \delta r - ((Vy + Lr \cdot \gamma)/V) \quad (7)$$

where $\delta f$ is front wheel steering angle, $\delta r$ is rear wheel steering angle, and n is steering gear ratio.

The above are fundamental equations of motion.

Here, the foregoing equations of motion represented with conditional variables, to develop the adaptive control theory by establishing the parametric adjustment law may allow for estimation of various parameters. Then, the cornering power of the actual vehicle is determined from the estimated parameters of the actual vehicle. The body mass and yawing inertial moment of the vehicle may be used as the estimated parameters, but in this case let us assume that these are constant and only the cornering power of vehicle's tires may vary. The factors influencing the cornering power of the tires may be non-linearity of lateral force in respect to slip angle, influence of the road surface friction coefficient $\mu$, and influence of load displacement. For example, the cornering powers Kf and Kr of the longitudinal wheels are given by the following expressions (8) and (9), when a parameter "a" estimated from a variation of yaw rate $\gamma$ and another parameter "b" estimated from the front wheel steering angle $\delta f$ are taken into consideration:

$$Kf = (b \cdot Iz \cdot n)/(2 \cdot Lf) \quad (8)$$

$$Kr = (a \cdot Iz + Lf + Kf)/Lr \quad (9)$$

Therefore, the cornering powers Kf and Kr of the longitudinal wheels in a non-linear range can be estimated by calculating the above expressions giving various values to the vehicle speed V, the steering angle $\delta f$ and the yaw rate $\gamma$. Then, the road surface friction coefficient $\mu$ can be calculated based on a comparison of the estimated cornering powers Kf and Kr respectively with, e.g., the ones on a high friction coefficient road, thereby resulting in setting of a more accurate estimation of the road surface friction coefficient $\mu$ in a non-linear range.

The road slope estimation section 23 calculates the road slope SL (%) using the following expression (10), based on the longitudinal accelerations given from the longitudinal acceleration sensor 6 and a change rate (m/s²) of the vehicle speed for each setting time calculated by the vehicle speed change calculator 21:

Road slope=(longitudinal acceleration−vehicle speed change rate/g)#100 (10)

where g (m/s²) is the gravitational acceleration, and (+) is a climbing direction of road slope.

Then, a change rate $\Delta SL$ of the estimated road slope SL is calculated. When the change rate $\Delta SL$ exceeds a given value, such data as an allowable deceleration XgLim, an allowable lateral acceleration ayln, a referential allowable approaching speed Vpn, a warning speed VA and a deceleration speed VB (to be described later) are recalculated, before starting control.

In this connection, as shown in the following expression (11), the road slope SL can be calculated using an engine output torque (N-m), a torque ratio of the torque converter (in the case of automatic transmission vehicle), a transmission gear ratio, a final gear ratio to be used, a radius of tire (m), a running resistance (N), a mass of vehicle (kg), a vehicle speed change rate (m/s²), and the gravitational acceleration g (m/s²):

Road slope SL=tan (sin$^{-1}$ (((engine output torque·torque ratio or torque converter·transmission gear ration·final gear ratio/radius of tire)−running resistance)/mass of vehicle−vehicle speed change rate)/g))·100) ≒((((engine output torque·torque ratio of torque converter·transmission running resistance)/mass of vehicle−vehicle speed change rate)/g)·100 . . . (11)

Furthermore, the road slope SL may be calculated based on altitude data obtained from the navigator 8, or based on road geometry data obtained from the road geometry detector 9.

The foregoing road slope SL calculated by the road slope estimation section 23 is output to the allowable lateral acceleration setting section 26 and the allowable deceleration setting section 28.

The curve geometry detector 24 is provided not only with point data (nodes) representing the roads in the map information and road type information, i.e., highway, ordinary national road or local road from the navigator 8, but also with the road width information from the road geometry detector 9. Receiving the input information, the curve geometry detector 24 calculates the curve data for every node within a set distance (forward control range, e.g., $V^2/(\mu \cdot g)$ assuming twice stop distance under $\mu \cdot g$ deceleration as curve detection range) ahead of the vehicle, so as to output to the data reduction section 25.

As shown in, e.g., FIG. 2, the curve geometry detector 24 comprises a three-node detection section 24a, a Pn−1Pn distance calculator 24b, a Pn Pn+1 distance calculator 24c, a long-short judgment section 24d, a mid-point calculator 24e, a mid-point same distance point calculator 24f, a radius calculator 24g and a correction section 24h.

As shown in FIG. 5, the three-node detection section 24a reads three nodes located at given intervals in the travelling direction of the vehicle or on the road selected by the driver, successively (from a node closer to the vehicle) as the first node Pn−1, the second node Pn and the third node Pn+1, from the road nodes input from the navigator 8. Among these read three nodes, the positional information of the first and second nodes Pn−1 and Pn are output to the Pn−1Pn distance calculator 24b, and the positional information of the second and third nodes Pn and Pn+1 are output to the PnPn+1 distance calculator 24c. Pn−1, Pn, and Pn+1 are represented by (Xn−1, Yn−1), (Xn, Yn), and (Xn+1, Yn+1), respectively. The representative node of the curve is Pn. Therefore, the curve data of points P1, P2, . . . , and Pn are calculated by the combination of (P0, P1, P2), (P1, P2, P3), . . . , and (Pn−1, Pn, Pn+1), respectively.

The Pn−1Pn distance calculator 24b calculates a straight distance connecting Pn−1 and Pn based on the positional information of Pn−1 and Pn input from the three-node detector 24a, so as to output the straight distance to the long-short judgment section 24d and the correction section 24h.

The PnPn+1 distance calculator 24c calculates a straight distance connecting Pn and Pn+1 based on the positional information of Pn and Pn+1 input from the three-node detector 24a, and outputs the straight distance to the long-short judgment section 24d and the correction section 24h.

The long-short judgment section 24d compares the straight distance connecting Pn−1 and Pn input from the Pn−1Pn distance calculator 24b and the straight distance connecting Pn and Pn+1 input from the PnPn+1 distance calculator 24c, so as to judge which is shorter. Every data (position, distance) for the shorter straight distance is output to the mid-point calculator 24e and the correction section 24g, while every data (position, distance) for the longer straight distance is output to the mid-point same distance point calculator 24f.

In this connection, when the comparison at the long-short judgment section 24d shows an equal length for the both straight distances, that is, when either one can be used, it is previously set so that the straight line connecting Pn−1 and Pn is to be handled as the shorter straight line (or it may be previously set so that the straight line connecting Pn and Pn+1 is to be handled as the shorter straight line).

Based on the every data (position, distance) for the shorter straight line input from the long-short judgment section 24d, the mid-point calculator 24e not only calculates half of the shorter straight distance, but also determines the mid point position on the shorter straight line. Here, when the shorter straight line is the straight line connecting Pn−1 and Pn, and when the mid-node Pn−1, n is represented as (Xn−1, n, Yn−1, n)

$$Pn-1,n=(Xn-1,n,Yn-1,n)=((Xn-1+Xn)/2,(Yn-1Yn)/2)$$

Furthermore, every data calculated by the mid-point calculator 24e is output to the mid-point same distance point calculator 24f and the radius calculator 24g.

Based on the data (position, distance) of the longer straight line input from the long-short judgment section 24d and the data (half the distance) of the shorter straight line input from the mid-point calculator 24e, the mid-point same distance point calculator 24f determines a mid-point same distance point at the position at half the distance of the shorter straight line apart from Pn on the longer straight line. Here, let us assume that the longer straight line is the line connecting Pn and Pn+1, and let us represent the mid-point same distance point by Pn, n+1 (Xn, n+1,Yn, n+1). Then, $$Pn,n+1=Pn+Pn,n+1=(Xn,Yn)+K2\cdot(Xb+1-Xn,Yn+1-Yn)=(Xn,n+1, Yn,n+1)$$

where, $K2=((Xn-Xn-1)^2+(Yn-Yn-1)^2)^{1/2}/(2\cdot((Xn+1-Xn)^2+(Yn+1-Yn)^2)^{1/2})$ The positional data of the mid-point same distance node Pn, n+1 calculated by the mid-point same distance point calculator 24f is output to the radius calculator 24g.

Figure 3:
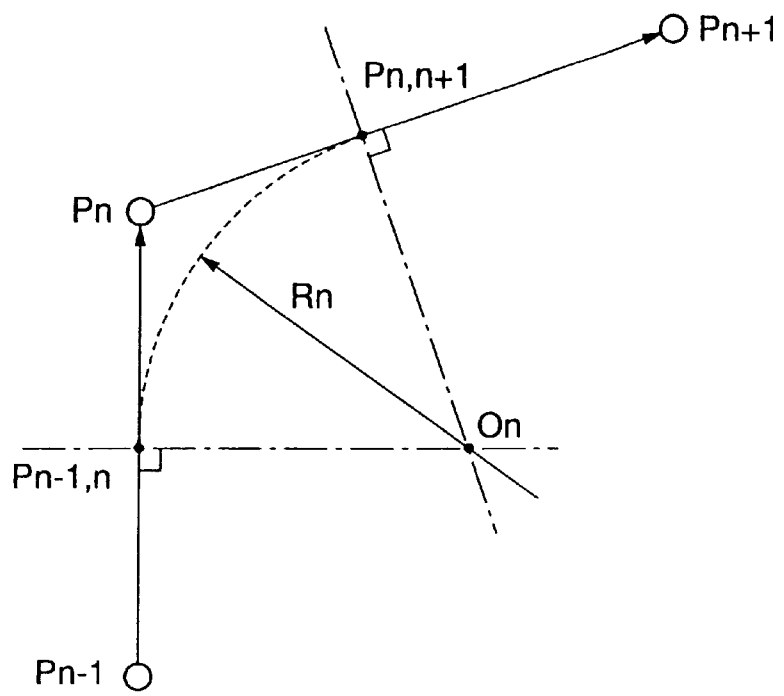
FIG. 3 is an illustration showing how to determine the radius of curvature of an emerging curve.

As shown in FIG. 3, based on the positional data of a mid-node Pn−1, n input from the mid point calculator 24e and the positional data of a mid-point same distance node Pn, n+1 calculated by the mid point same distance point calculator 24f, the radius calculator 24g determines as the central position "On" of the emerging curve on the road the position of the crossing point of a line that crosses the shorter straight line (here, Pn−1 Pn) at right angle with each other at the mid-node Pn−1, n and a line that crosses the longer straight line (here, Pn Pn+1) at right angle with each other at the mid-point same distance node Pn, n+1. Then, based on the determined central position "On", the radius calculator 24g calculates the radius of curvature Rn of the curve. The calculation results are output to the correction section 24h.

In other words:

$$On=Pn-1,n+Pn-1,nOn=(Xn-1,n,Yn-1,n)+M\cdot(Yn-1,Xn-1-Xn) \quad (12)$$

$$On=Pn,n+1+Pn,n+1On=(Xn,n+1,Yn,n+1)+N\cdot(Yn+1-Yn,Xn-Xn+1) \quad (13)$$

Therefore, $$Xn-1,n+M\cdot(Yn-Yn-1)=Xn,n+1+N\cdot(Yn+1-Yn) \quad (14)$$

$$Yn-1,n+M\cdot(Xn-131\ Xn)=Yn,n+1+N\cdot(Xn-Xn+1) \quad (15)$$

Elimination of M from both expressions (14) and (15) can obtain N as follows:

$$N=((Xn-1-Xn)\cdot(Xn-1,n-Xn,n+1)+(Yn-1-Yn)\cdot(Yn-1,n-Yn,n+1))/(Xn-1\cdot Yn+1-Xn+1\cdot Yn-1-Xn-1\cdot Yn+XnYn-1-Xn\cdot Yn+1+Xn+1\cdot Yn) \quad (16)$$

The position "On" of curve center is:

$$On=(Xon,Yon)=(Xn,n+1+N\cdot Yn+1-N\cdot Yn,Yn,n+1+N\cdot Xn-N-Xn+1\overline{)} \quad (17)$$

Therefore, the radius of curvature Rn is obtained from the following expression (18):

$$Rn=((Xn-Xn-1)\cdot(Yn+1-Yn)-(Xn+-Xn)\cdot(Yn-Yn-1))/|((Xn-Xn-1)\cdot(Yn+1-Yn)-(Xn+1-Xn)\cdot(Yn-Yn-1))|\cdot((Xon-Xn-1,n)^2+(Yon-Yn-1,n)^2)^{1/2} \quad (18)$$

Here, the case when the radius of curvature Rn is positive means a left turn and the case when the radius of curvature Rn is negative means a right turn.

The distance Lon from the center of the curve On to the representative node of the curve, i.e., the second node Pn is obtained from the following expression (19):

$$Lon=((Xon-Xn)^2+(Yon-Yn)^2)^{1/2} \quad (19)$$

The correction section 24h calculates the difference Deln between the radius of curvature Rn obtained by the radius calculator 24g and the distance Lon from the curve center position On to the second node Pn. When the difference Deln exceeds a given error value (to be described later), the correction section 24h corrects the radius of curvature Rn so that the difference Deln be within the given error value.

Final curve information for each node, which have been corrected by the correction section 24h or left intact because of the difference Deln being smaller than the given error set value, are output to the data reduction section 25 for storage and subsequent processing. Here, the final curve information for each node includes the position (Xn, Yn) of the representative node Pn of a curve; the distance Ln between node Pn−1 and node Pn; final radius of curvature Rn; curve angles θn obtained from the angle formed by lines Pn−1 Pn and Pn Pn+1; the distance between the curve starting point Lsn (the intersection point of the line Pn−1 Pn and the perpendicular from the curve center On to the line Pn−1 Pn) and the node Pn−1; and the distance Lssn from vehicle position to each representative node of the curve.

The error set value depends on road width D and the shorter line distance judged by the long-short judgment section 24d, thereby being represented as α·D. (Here, α is a constant to be set in accordance with the shorter line distance, hereinafter referred to as a node interval correction factor.)

Normally, a road width obtained from the road geometry detector 9 is to be adopted for the foregoing road width D, but, when the road geometry detector 9 cannot tell any road width, the foregoing road width D may be set based on the road type information to be obtained from the navigator 8. In this connection, the wider the road width D, the larger the error set value, thus going toward no correction. This means that, the wider the actual road width, the larger the radius of the curvature Rn.

The fact that the interval of nodes is short means that the road is accurately defined by nodes on the map. In that case, corrections of the difference Deln is not significant.

Therefore, as with the node interval correction factor $\alpha$, the shorter the shorter line distance, the larger the node is interval correction factor $\alpha$, thus increasing the error set value to eliminate the chance for correction. For example, when the shorter line distance is shorter than 20 m, $\alpha=1.2$, and when the shorter line distance is shorter than 100 m, $\alpha$ is taken as 0.6, and when the shorter line distance is longer than 100 m, $\alpha$ is taken as 0.3.

Figure 4:
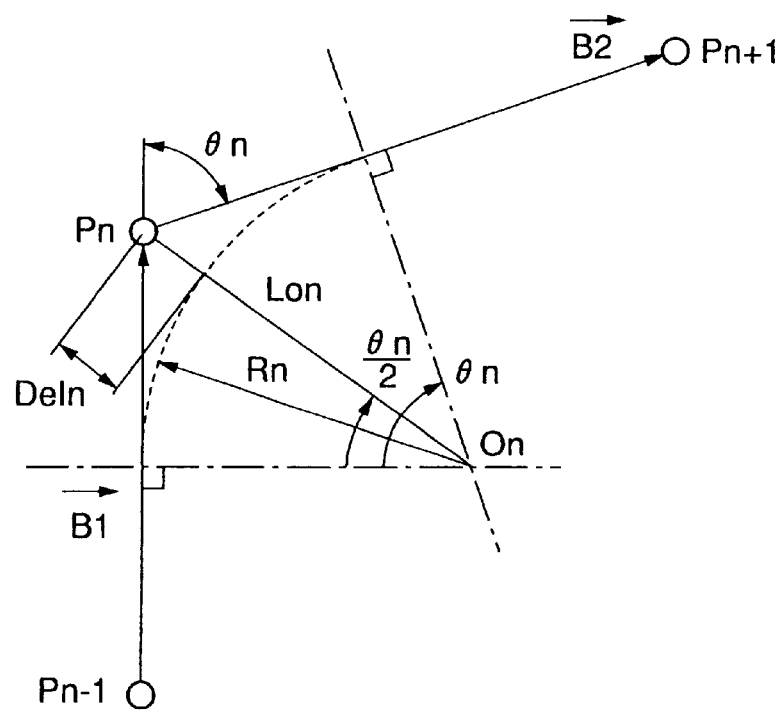
FIG. 4 is an illustration showing how to correct the obtained radius of curvature of the emerging curve.

FIG. 4 shows a detailed correction to be made by the correction section 24h. The vector from Pn−1 to Pn is denoted as B1ve (ve meaning a vector), and the vector from P2 to P3 is denoted as B2ve.

$$B1ve=(Xn-Xn-1,Yn-Yn-1)=(Xb1,Yb1), B2ve=(Xn+1-Xn,Yn+1-Yn)=(Xb2,Yb2)$$

An angle formed by B1ve and B2ve is as follows:

$$\cos \theta n=(Xb1 \cdot Xb2+Yb1+Yb2)/(|B1ve| \cdot |B2ve|)$$

The error (ratio) Pdeln between Lon and Rn is as follows:

$$Pdeln=Rn/Lon=\cos(\theta n/2)=((\cos \theta n+1)/2)^{1/2} \quad (20)$$

Therefore, the difference Deln is as follows $$Deln=Lon-|Rn|=Lon \cdot (1-Pbe\ in)=Lon \cdot (1-(\cos \theta n+1)/2)^{1/2}) \quad (21)$$

In this connection, when the difference Deln is larger than the error set value ($\alpha \cdot D$), correction is made so that Deln equals $\alpha \cdot D$ for the radius of curvature Rn.

In detail, $$Lon=Deln/(1-((\cos \theta n+1)/2)^{1/2})=\alpha \cdot D/(1-((\cos \theta n+1)/2)^{1/2})=\alpha \cdot D/(1-((Xb1 \cdot Xb1 \cdot Xb2+Yb1 \cdot Yb2+|B1ve| \cdot |B2ve|)-/(2 \cdot$$

$$|B1ve| \cdot |B2ve|))^{1/2})Rn=Lon \cdot Pdeln=\alpha \cdot D/(1-((\cos \theta n+1)/2)^{1/2}) \cdot ((\cos \theta n+1)2)^{1/2}$$

$$=\alpha \cdot D/((2/((\cos \theta n+1))^{1/2}-1)=\alpha \cdot D/((2 \cdot |B1ve| \cdot |B2ve|/(Xb1 \cdot Xb2+Yb1 \cdot Yb2+|B1ve| \cdot |B2ve|))^{1/2}-1) \quad (22)$$

As described, since curve information is obtained from the curve geometry detector 24, the irregular nodes from the navigator 8 can be used as it is, thus resulting in simple calculation without data supplement or complex calculations, so that the radius of curvature of a road being traveled on can be determined quickly and accurately.

Further, in this case, since the continuity between each curve detection node for determining the radius of curvature is natural or smooth, data accurately representative of an actual load geometry can be obtained.

Furthermore, even if possible calculation errors appear, the calculated radius of curvature always becomes smaller than the actual radius of curvature, thereby preferable when setting off a proper warning in the warning/deceleration control when approaching a curve.

Provision of the correction section 24h for the radius of curvature can help an accurate calculation of the radius of curvature. Furthermore, the error set value which a variable in accordance with the actual road geometry and the number of node can make calculations more accurate. In other words, since the wider road actually represents the larger radius of curvature, the wider the road width, the larger the error set value, thus eliminating the need or chance for correction. Furthermore, a shorter straight line distance results in fine setting of nodes, thus probably representing the road more accurately, so that the shorter the shorter line distance, the larger the error set value, thereby the more eliminating the chance for correction.

The data reduction section 25 is provided to reduce data (belonging to every node) detected by the curve geometry detector 24 and sends the reduced data for further calculation, to the allowable lateral acceleration setting section 26, the referential allowable approaching speed setting section 27; the warning speed calculation/memory section 29; the deceleration speed calculation/memory section 30; the warning judgment output section 32; and the deceleration judgment output section 33, thus eliminating unnecessary calculations.

In other words, in the event that a curve stored in the navigator 8 is represented by a few nodes, it sometimes happens that curve information calculated for some of the nodes becomes useless for the warming/deceleration control.

Therefore, considering the above situation, the data reduction section 25 assumes the following four cases to reduce the voluminous curve information only to really needed ones.

Figure 7A:
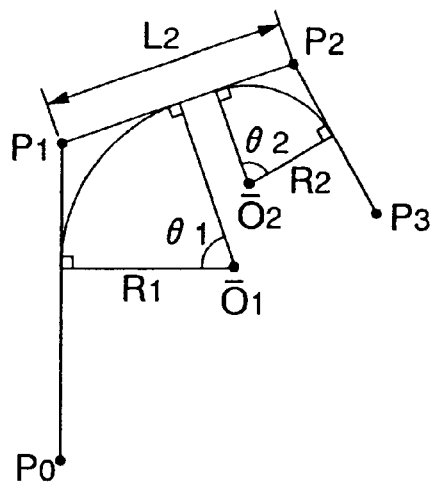
FIGS. 7A to 7D are illustrations showing the four cases at data reduction section.

CASE 1—Sharp curve, but there is a marginal deceleration distance (=Rn−1−Rn) before reaching node Pn from node Pn−1 (FIG. 7A)

If $|Rn-1|>|Rn|,Rn-1 \cdot Rn>O$, and $Ln>|Rn-1|-|Rn|$, then the curve information for the nodes Pn−1 and Pn is each necessary. Because there is a marginal distance for deceleration before the vehicle reaches node Pn from node Pn−1, independent control may be necessary for both nodes.

Considering that node Pn−1 and node Pn both represent the same curve, a total curve angle $\theta sn$ at node Pn is considered to be equal to the sum of a total curve angle $\theta s$ (n−1) at node Pn−1 and $2 \cos^{-1}$ (Rn/Lon). Therefore, the total curve angle $\theta sn$ at node Pn=the total curve angle $\theta s$ (n−1) at node Pn−1+$2 \cos^{-1}$ (Rn/Lon).

Figure 7B:
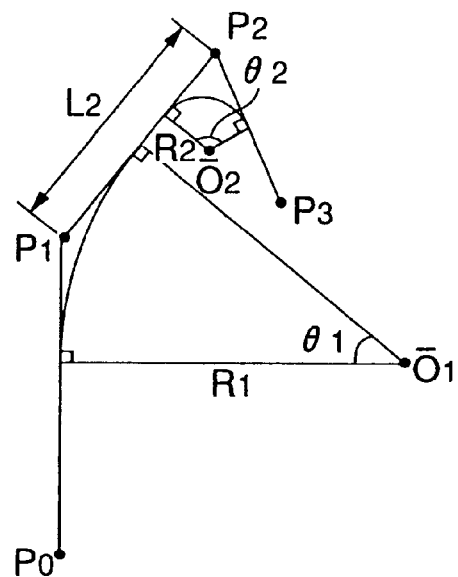

CASE 2—A sharp curve, and there is no marginal deceleration distance (=Rn−1−Rn) before reaching node Pn from node Pn−1 (FIG. 7B)

If $|Rn-1>|Rn|,Rn-1 \cdot Rn>0$, and $Ln<|Rn-1|-|Rn|$, then the curve information of node Pn−1 can be neglected. In other words, the execution of control for node Pn curve can absorb the execution of control for node Pn−1 curve, thus making the curve information of node Pn−1 useless (negligible), so that the total number of control executions to be made can be minimized.

Considering that node Pn−1 and node Pn both represent the same curve, a total curve angle $\theta sn$ at node Pn is considered to be equal to the sum of a total curve angle $\theta s(n-1)$ at node Pn−1 and $2 \cos^{-1}$ (Rn/Lon). Therefore, the total curve angle $\theta sn$ at node Pn=the total curve angle $\theta s(n-1)$ at node Pn−1+$2 \cos^{-1}$ (Rn/Lon).

Figure 7C:
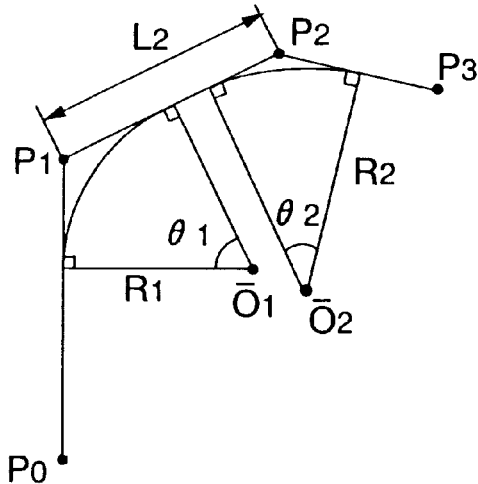

CASE 3—Mild curve (FIG. 7C)

If $|Rn-1|<|Rn|,Rn-1 \cdot Rn>O$, then the curve information of node Pn can be neglected. In other words, since the vehicle is sufficiently decelerated by the node Pn−1, the curve information of the node Pn which represnts a milder curve than that of the node Pn−1 is useless, thus being neglected. In this connection, in the case of long Ln, full acceleration (if node Pn−1 and node Pn both can be regarded as independent curves) may boost the vehicle speed a great deal before the vehicle reaches node Pn, so that the curve information for node Pn may be maintained depending on the magnitude of Ln.

Considering that node Pn−1 and node Pn both represent the same curve, a total curve angle θsn at node Pn is considered to be equal to the sum of a total curve angle θs(n−1) at node Pn−1 and $2 \cos^{-1}$ (Rn/Lon). Therefore, the total curve angle θsn at node Pn=the total curve angle θs(n−1) at node Pn−1+$2 \cos^{-1}$ (Rn/Lon).

In this connection, if the curves at node Pn−1 and node Pn are regarded as independent from each other, the curve angle θn at the node Pn is not added, but a new addition calculation will be started (depending on the magnitude of Ln).

Figure 7D:
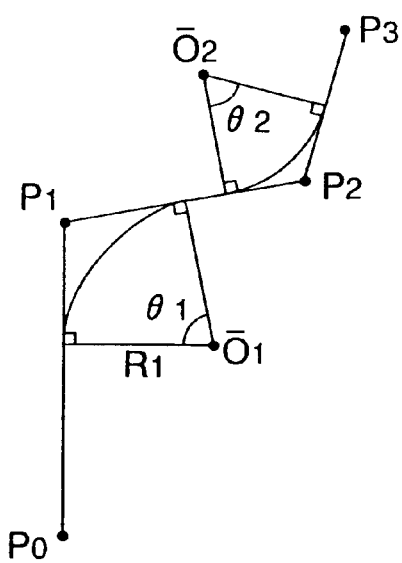

CASE 4—The turning directions of curves are changed from right to left or from left to right (FIG. 7D).

If Rn−1Rn<O, then, the curve information for node Pn is needed since turning direction is considered to be different when the vehicle runs from node Pn−1 to node Pn.

The addition result of curve angles which continued up to node Pn−1 is defined as the total curve angle θs(n−1) up to node Pn−1.

Furthermore, node Pn can be a start point to calculate a total curve angle θsn independent from the total curve angle θs(n−1).

The total curve angle θsn at node Pn=$2 \cos^{-1}$ (Rn/Lon)

Figure 8:
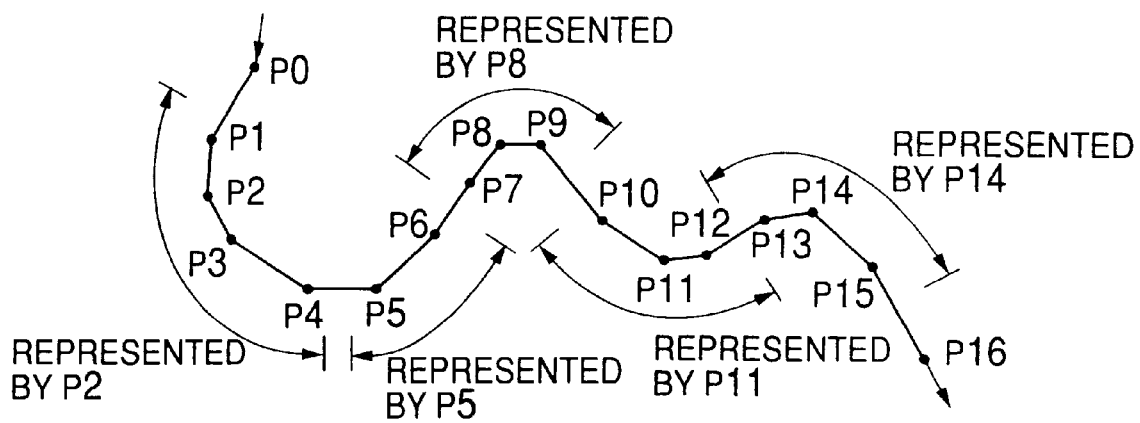
FIG. 8 is an illustration showing one example of a road under data reduction.
Figure 9:
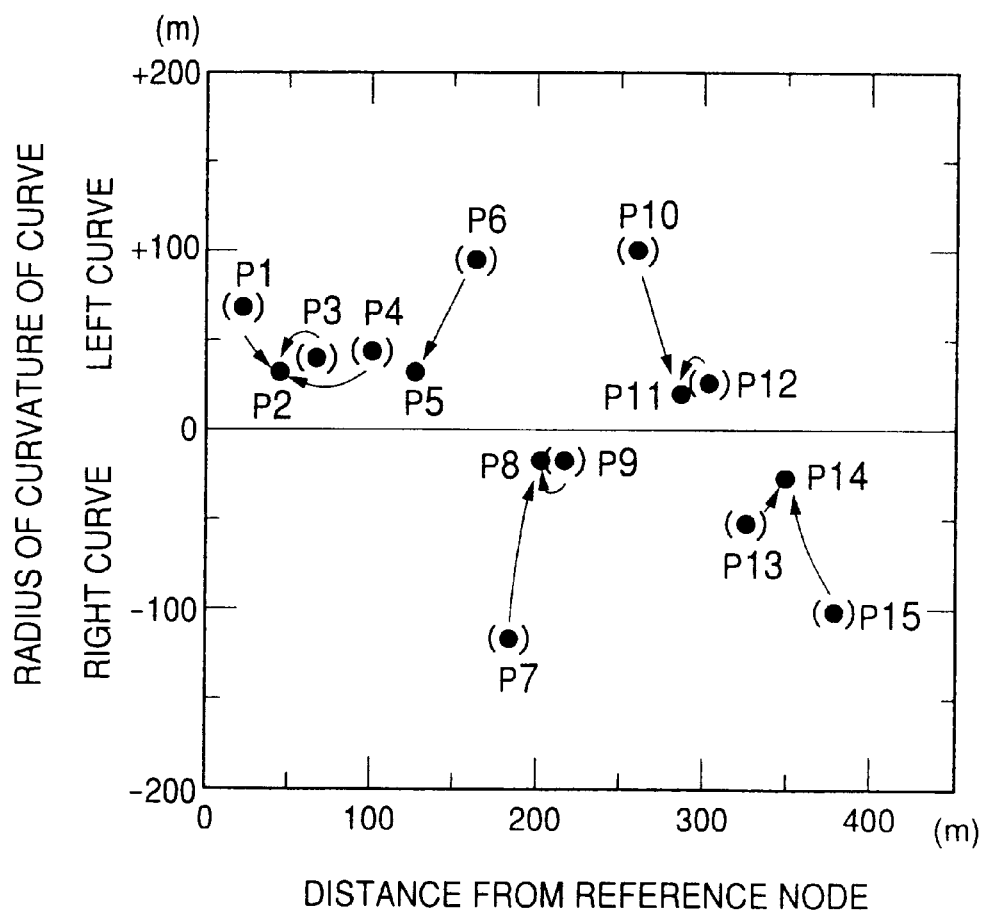
FIG. 9 is an illustration showing the radii of curvature of curves at points in FIG. 8.

In this calculation, the reason why the deceleration distance is defined as the difference between the radius of curvature Rn and the radius of curvature Rn−1 is as follows:

Theoretically the deceleration distance is expressed as follows:

Deceleration distance=(Vp(n−1)²−Vpn²)/(2·a)=(Rn−1ayl(n−1)−Rnayln)/(2·a)=(Rn−1−Rn)·ayl/(2·a)

where Vpn=reference allowable approaching speed at node Pn a=deceleration ayln=allowable lateral acceleration When the deceleration a is assumed to be ½ ayl, then Deceleration distance=Rn−1−Rn FIGS. 8, 9 and 10 show an example where the foregoing four cases are applied to actual running: When a vehicle run from P1 to P15 on such a road as shown in FIG. 8, FIGS. 9 and 10 show the results of the curve information calculated. The radii of curvature of the curves P1 to P15 were obtained by the curve geometry detector 24 as shown in FIG. 9. FIG. 10 is a table showing the results which the data reduction section 25 calculated based on the curve information for each node.

In this example, the case 2 is applied to the route P1 to P2, the case 3 is applied to the route P2 to P3 and to the route P3 to P4, and therefore, nodes P1, P3 and P4 are neglected. As the result, nodes P1, P2, P3 and P4 are represented by node P2.

The case 1 is applied to the route P4 to P5, thus necessitating node P4. But, when the vehicle was running from P3 to P4, P4 has been judged unnecessary, so that node P4 is neglected (or eliminated from this calculation). The case 3 is applied to the route P5 to P6, and node P6 is eliminated (or represented by node P5).

The case 4 is applied to the route P6 to P7 because of turning direction change, thus judging that node P7 is necessary. But, the case 2 is applied to the route P7 to P8, resulting in a judgment that node P7 is unnecessary, so that node P7 is eliminated. The case 3 is applied to the route P8 to P9, and P9 is neglected (or represented by node P8).

The case 4 is applied to the route P9 to P10 because of turning direction change, thus judging that node P10 is necessary. But, the case 2 is applied to the route P10 to P11, resulting in a judgment that node P10 is unnecessary, so that node P10 is eliminated. The case 3 is applied to the route P11 to P12, and node P12 is neglected (or represented by node P11).

The case 4 is applied to the route P12 to P13 because of turning direction change, thus judging that node P13 is necessary. But, the case 2 is applied to the route P13 to P14, resulting in a judgment that node P13 is unnecessary, so that node P13 is eliminated. The case 3 is applied to the route P14 to P15, and node P15 is neglected (or represented by node P14).

As the results of the data reduction, the total fifteen nodes are reduced to necessary five nodes, thus resulting in a substantial reduction of calculation and memory volume, as well as a speedy processing.

As described above, the curve detection means according to the embodiment comprises the navigator 8, the road geometry detector 9, the curve geometry detector 24 and the data reduction section 25.

The allowable lateral acceleration setting section 26 comprises a reference value setting section 26a, a vehicle speed correction section 26b, a curve angle correction section 26c, and a road slope correction section 26d. The reference value setting section 26a calculates a reference value ayl1n of an allowable lateral acceleration ayln in accordance with the road surface friction coefficient $\mu$. The vehicle speed corrected section 26b corrects the reference value ayl1n to a corrected value ayl2n in accordance with the vehicle speed V. The curve angle correction section 26c corrects the corrected value ayl2n to a corrected value ayl3n in accordance with the total curve angle θsn and the direction of the curve to which node Pn belongs. The road slope correction section 26d corrects the corrected value ayl3n in accordance with the road slope SL, to obtain the allowable lateral acceleration ayln.

To sum up, the allowable lateral acceleration setting section 26 is constituted as allowable lateral acceleration setting means, and the set allowable lateral acceleration ayln is output to the reference allowable approaching speed setting section 27.

The reference value ayl1n is calculated at the reference value setting section 26a using, e.g., the following expression (23):

$$\text{ayl1n} = \text{road surface friction coefficient } \mu' \text{ at curve safety factor } K\mu \cdot \text{gravitational acceleration } g \quad (23)$$

where the road surface friction coefficient $\mu'$ at curve is assumed to be equal to the surface friction coefficient $\mu$ of the road on which the vehicle is now running, so that the estimated value of the road surface friction coefficient estimation section 22 is used as it is. The safety factor K$\mu$ is taken as 0.5 to 1.0 taking into consideration the estimation accuracy to the road surface friction coefficient $\mu$ and the vehicle characteristics (e.g., generation of lateral acceleration of 0.5 G is impossible when the road surface friction coefficient $\mu$ is 0.5).

Figure 11A:
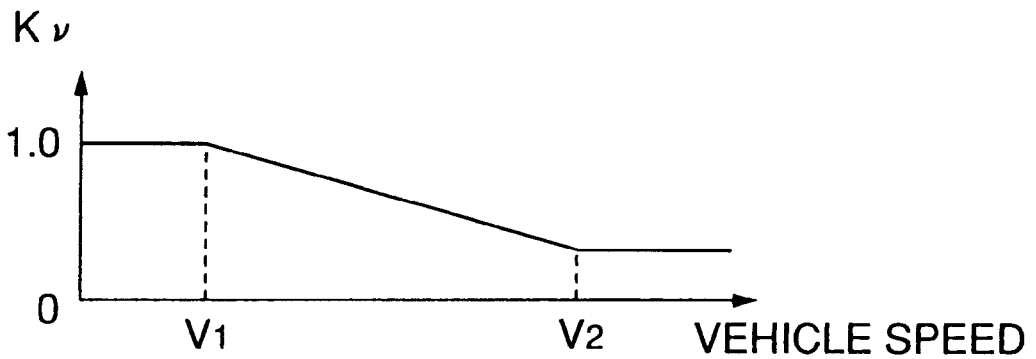
FIGS. 11A and 11B are illustrations showing the characteristics curve of vehicle speed correction coefficient and curve angle correction coefficient.

The corrected value ayl2n is calculated by the vehicle speed correction section 26b using e.g., the following expression (24):

$$\text{ayl2n} = \text{reference value ayl1n} \cdot \text{vehicle speed correction factor } Kv \quad (24)$$

where, as shown in FIG. 11A, the vehicle speed correction factor Kv is taken so that the higher the vehicle speed, the smaller the value. In other words, to enhance the driving safety at a high speed running, the allowable lateral acceleration at a curve is so corrected to be reduced as the vehicle speed becomes faster.

Figure 11B:
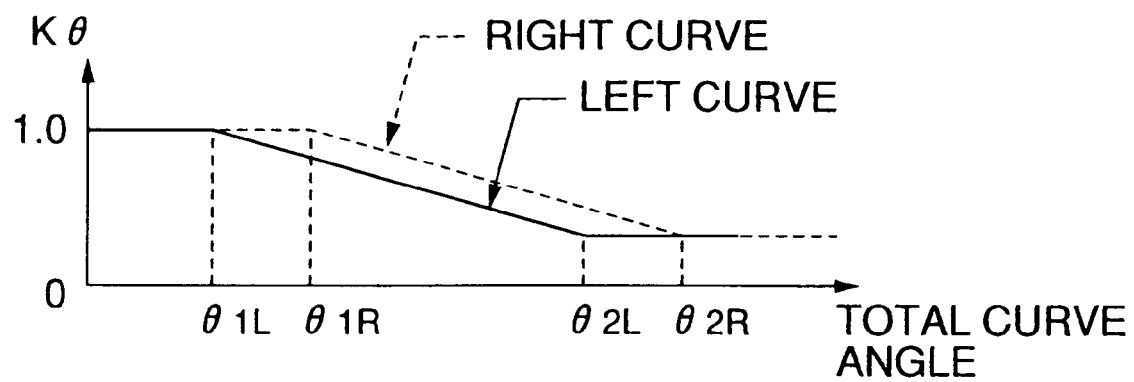

The corrected value ayl3n is calculated by the curve angle correction section 26c using e.g., the following expression (25):

$$\text{ayl3n=corrected value ayl2n·curve angle correction factor } K\theta \quad (25)$$

where, as shown in FIG. 11B, the curve angle correction factor $K\theta$ is taken so that the larger the total curve angle $\theta$sn, the smaller the value. In other words, taking a high criticality in the case of a large $\theta$sn into consideration, the allowable lateral acceleration is corrected to be reduced as the total curve angle $\theta$sn increases. Furthermore, the curve angle correction factor $K\theta$ is determined depending on the direction (left or right) of curve turning. This means (when driving on the left side of the road) that the right turns allow not only a good forward view, but also a large radius of turning, so that the curve angle correction factor $K\theta$ for right turns is determined to be larger.

The road slope correction section 26d makes the final correction to be made at the allowable lateral acceleration setting section 26. The allowable lateral acceleration obtained thereby is calculated using e.g.:

$$\text{ayln}=(\text{ayl3n}^2-(g\cdot\sin(SL/100))^2)^{1/2} \approx (\text{ayl3n}^2-(g\cdot(SL/100))^2)^{1/2} \quad (26)$$

where the road slope SL in the above expression (26) is the value obtained by the road slope estimation section 23 using expression (10) or (11).

The lateral force to tire becomes maximum when the longitudinal force to tire is zero. When this happens, the vehicle speed is being decelerated with the upward slope so as to have margin, while the vehicle is being accelerated on a downward slope, thus increasing criticality. Therefore, on a downward slope, assuming that the combination of the longitudinal force and the lateral force which can be generated by the tire is constant as a frictional circle, an allowable lateral acceleration ayln less a brake force for traveling the slope at a constant speed is set.

The reference allowable approaching speed setting section 27 is a means for setting a reference allowable approaching speed Vpn based on the radius of curvature Rn of curve given by the data reduction section 25 and the allowable lateral acceleration ayln given by the allowable lateral acceleration setting section 26. Each reference allowable approaching speed Vpn which has been set is output to the warning speed calculation/memory section 29 and the deceleration speed calculation/memory section 30.

The reference allowable approaching speed Vpn to be set by the reference allowable approaching speed setting section 27 is calculated using the following expression (27):

$$\text{Vpn}=(\text{ayln}\cdot\text{Rn})^{1/2} \quad (27)$$

The allowable deceleration setting section 28 comprises a reference value setting section 28a and an allowable deceleration correction section 28b to constitute a means for setting a deceleration (allowable deceleration XgLim) which is allowed for a vehicle in accordance with the road conditions including the road surface friction coefficient $\mu$ and the road slope SL. The allowable deceleration XgLim to be set by the allowable deceleration setting section 28 is output to the warning speed calculation/memory section 29, the deceleration speed calculation/memory section 30, the warning judgment output section 32, the deceleration judgment output section 33 and the selection section 34.

The reference value setting section 28a sets a reference value XgLim0 based on the present road surface friction coefficient $\mu$ estimated by the road surface friction coefficient estimation section 22, using the following method:

$$\text{XgLim0}=\mu\cdot g\cdot K\mu 2 \quad (28)$$

or XgLim0=axc (constant value for unexcessive deceleration), and one which is smaller is selected.

Here, taking the road surface utilization factor under full braking into consideration, the coefficient $K\mu 2$ is selected as 0.8 or so. The constant axc is previously set by experiment or theoretical calculation, e.g., 5 m/s² or so.

The allowable deceleration correction section 28b determines an allowable deceleration XgLim, using the following expression (29): According to this, the allowable deceleration is corrected to be larger taking account of deceleration due to gravity on a climbing slope, thereby to delay warning/deceleration control. Moreover, the allowable deceleration is corrected to be smaller taking account of acceleration due to corrected to be smaller taking account of acceleration due to gravity on a down slope, so as to advance the warning/deceleration control.

$$\text{XgLim}=\text{XgLim0}+g\cdot SL/100 \quad (29)$$

The warning speed calculation/memory section 29 is a means for calculating a reference allowable approaching speed as warning speed VA for warning control based on the allowable deceleration XgLim to be set by the allowable deceleration setting section 28; the reference allowable approaching speed Vpn to be set by the reference allowable approaching speed setting section 27; and the distance Ls between node Pn−1 and node Pn stored at the data reduction section 25. As shown in the table (FIG. 12), each warning speed VA calculated by the warning speed calculation/memory section 29 is stored together with a deceleration speed VB (to be described later), and the stored warning speed VA is fetched to the warning judgment output section 32 as required.

The warning speed calculation/memory section 29 regards 50% of the attainable deceleration SgLim as a threshold for warning.

A warning speed VA12 at the reference node P1 for a next node P2 (distance L2 ahead) is obtained in accordance with a passable speed (=reference allowable approaching speed Vp2) at node P2 as follows:

$$\text{VA12}=\text{Vp2}^2+2(0.5\cdot\text{XgLim})\cdot L2)^{1/2}$$

Similarly, a warning speed VA13 at the reference node P1 for a farther node P3 (distance L2+L3 ahead) is obtained in accordance with a passable speed (=reference allowable approaching speed Vp3) at node P3 as follows:

$$\text{VA13}=(\text{Vp3}^2+2\cdot(0.5\cdot\text{XgLim})\cdot(L2+L3))^{1/2}$$

Generally, the relationship between a warning speed $VA\alpha\beta$ at the reference node $P\alpha$ for a forward node $P\beta$ (distance $L(\alpha+1)+\ldots+L\beta$ ahead) and a passable speed (=reference allowable approaching speed $Vp\beta$) at the node $P\beta$ is given by the following expression (30):

$$VA\alpha\beta=(VP\beta^2+2\cdot(0.5\cdot\text{XgLim})\cdot(L(\alpha+1)+\ldots+L\beta))^{1/2} \quad (30)$$

The deceleration speed calculation/memory section 30 is a means for calculating an allowable approaching speed to be a criterion for deceleration control (as deceleration speed VB) based on the allowable deceleration XgLim set by the allowable deceleration setting section 28; the reference allowable approaching speed Vpn set by the reference allowable approaching speed setting section 27; and the Pn−1 to Pn distance Ln stored in the data reduction section 25. As shown in the table in FIG. 12, the deceleration speed VB calculated by the deceleration speed calculation/memory seciton 30 is stored together with the warning speed VA calculated by the warning speed calculation/memory section 29, and the stored data are fetched to the deceleration judgment output section 33 as required.

The deceleration speed calculation/memory section 30 regards 80% of the allowable deceleration SgLim as a threshold for enforced deceleration.

The judgment speed for enforced deceleration (speed VB12) at the reference node P1 for a next node P2 (P2 to P1 distance L2) is obtiened depending on the passable speed at the node P2 (=reference allowable approaching speed Vp2) as follows:

$$VB12 = (Vp2^2 + 2 \cdot (0.8 \cdot XgLim) \cdot L2)^{1/2}$$

Similarly, the judgment speed for enforced deceleration (speed VB13) at the reference node P1 for a farther node P3 (P3 to P1 distance L2+L3) is obtained according to the passable speed at the node P3 (=reference allowable approaching speed Vp3) as follows:

$$VB13 = (Vp3^2 + 2 \cdot (0.8 \cdot XgLim) \cdot (L2+L3))^{1/2}$$

Generally, the relationship between the judgment speed for enforced deceleration (deceleration speed VBαβ) at the reference node Pα for a forward node Pβ (Pβ to Pα distance L(α+1)+ ... +Lβ) and the passable speed at the node Pβ (=reference allowable approaching speed Vpβ) is given by the following expression (31):

$$VB\alpha\beta = (Vp\beta^2 + 2 \cdot (0.8 \cdot XgLim) \cdot (L(\alpha+1)+ \ldots +L\beta))^{1/2} \quad (31)$$

Figure 12:
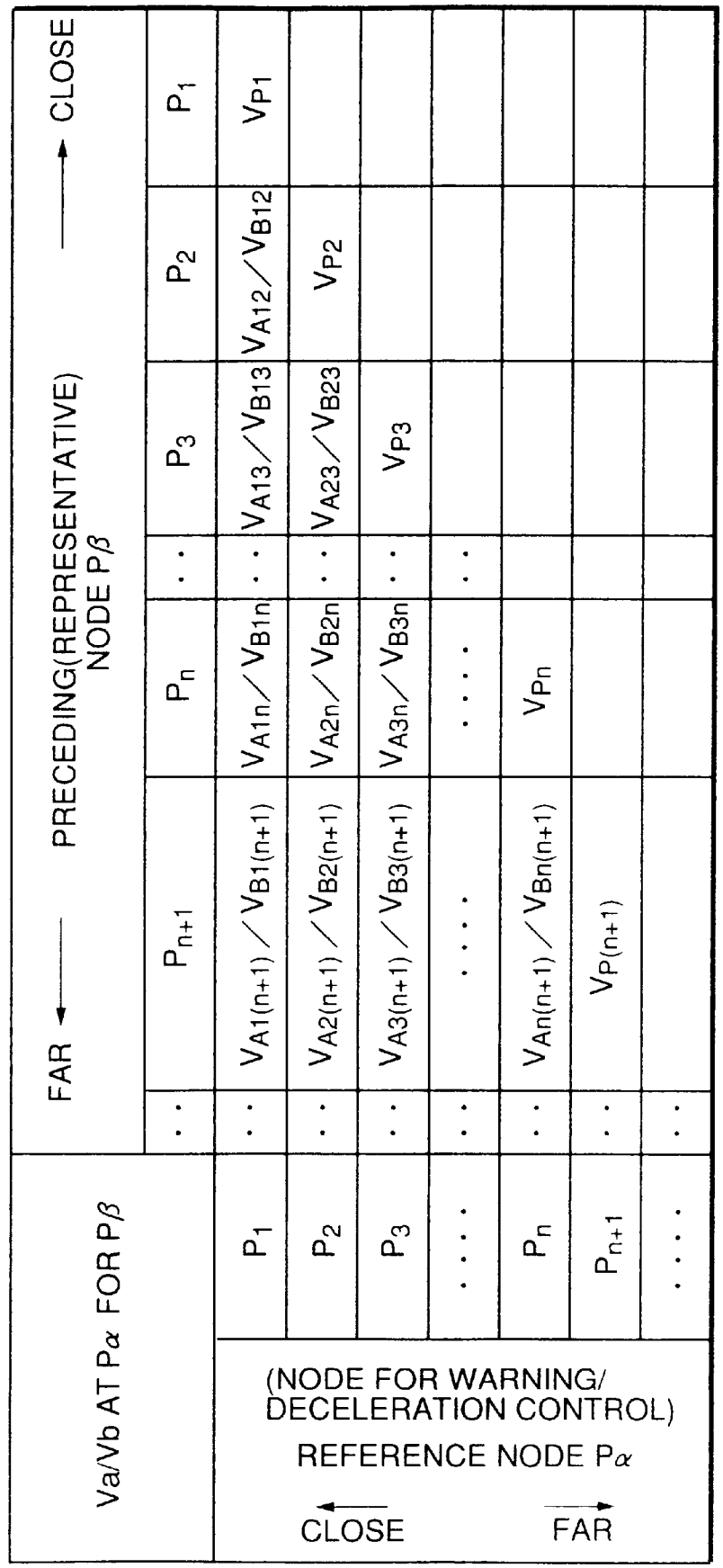
FIG. 12 is a table showing one example of warning speed and decelerated speed to be stored.
Figure 13:
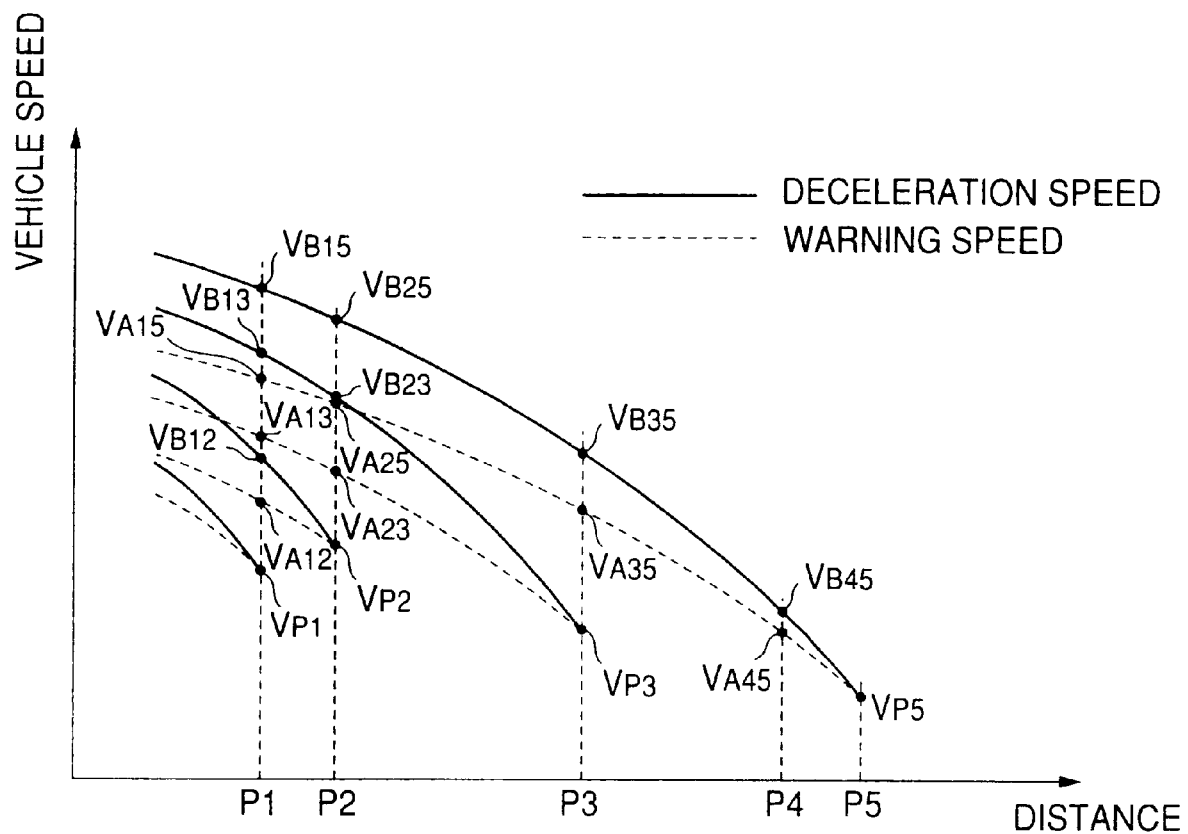
FIG. 13 is an illustration showing the relation of warning speed and decelerated speed to be stored.

FIG. 13 is an illustration showing the relationship between the warning speed to be stored in the table shown in FIG. 12 and the deceleration speed. For example, comparison of respective warning speeds plotted on the vertical line at P1 shows that Vp1<VA12<VA13<(VA14 is eliminated)<VA15. This means that a warming speed force farther node is set larger because of more marginal distance from the reference node P1.

In the table shown in FIG. 12, considering the moment when the vehicle is passing the node P1, data (VA1(n+1)/VB1(n+1)~Vp1) or the top row at the table becomes unnecessary, thus being eliminated from the memory or table.

Similarly, when node Pn+1 enters the calculation region, calculated data (VA1(n+1)/VB1(n+1)~Vp(n+1)) for the node Pn+1 is added to the leftmost side of the table. If information of node Pn+1 has been reduced and eliminated, this calculation becomes unnecessary.

For example, in the case where the data reduction section 25 has already eliminated the data of the node P2, the data (VA12/VB12~Vp2) for the node P2 in the table is also eliminated. Accordingly, when approaching to node P2, the vehicle makes no control at Vp2, but makes warning control at VA23 and deceleration control at VB23.

As described, since the warning speed VA and the deceleration speed VB calculated based on the allowable deceleration XgLim, the reference allowable approaching speed Vpn and the distance Ln, take into account the road surface friction coefficient μ and the road slope SL, a practical control with high reliability and stability can be carried out in accordance with the actual road surface friction coefficient μ and the road slope SL. When the actual road surface friction coefficient μ and the road slope SL are changed, new values for the allowable deceleration XgLim, allowable lateral acceleration ayln, reference allowable approaching speed Vpn, warning speed VA, and speed VB are reset, so as to make an optimum control corresponding to these new data.

For control execution and judgment, signals from the turn signal switch 7 and steering angle sensor 3 and signal from the vehicle speed change calculator 21 are input to the control execution determination section 31. Aided with the signals, the control execution determination section 31 judges the release (OFF) of warning control, the release (OFF) of warning/deceleration control and a switch from deceleration control to warning control, so as to output the judgment results to the warning judgment output section 32 and the deceleration judgment output section 33.

For instance, there may be such a case that a main road now running has a curve ahead, but before reaching the curve, the vehicle is getting off the main road to a minor road which extends almost straight from the main road but is missing in the navigator 8. In that situation, warning control or deceleration control if happens, is annoying for the driver. To avoid it, according to the invention, the warning control and/or deceleration control is prohibited when the driver operates the turning signal ,switch 7. Furthermore, it can be predicted that the driver makes unusual driving: including sporty driving when the steering angle from the steering angle sensor 3 becomes larger than a predetermined amount. According to the invention, in that case, the warning control and/or deceleration control is prohibited. Furthermore, if an actual deceleration or vehicle speed change calculated by the vehicle speed change calculator 21 is larger than the threshold deceleration (0.5−=XgLim) for warning, it is regarded that the driver is well reacting to a curve ahead and therefore warning is not necessary. According to the invention, in that case, at least the warning control is prohibited. Furthermore, if an actual deceleration or vehicle speed change calculated by the vehicle speed change calculator 21 is larger than the threshold deceleration (0.8:XgLim) for deceleration control, it is regarded that the driver is well reacting to a curve ahead and therefore enforced deceleration is not necessary. According to the invention, in that case, at least the deceleration control is prohibited.

The warning judgment output section 32 can read the distance L1 between the present vehicle position P0 and the closest node P1 from the data reduction section 25; the allowable deceleration XgLim from the allowable deceleration setting section 28; each warning speed VA1β (VA1(n+1)~Vp1) at node P1 from the warning speed calculation/memory section 29; and the vehicle speed V from the vehicle speed sensor 5.

Receiving the distance L1 and the allowable deceleration XgLim, the warning judgment output section 32 can transform the respective warning speeds VA1β (VA1(n+1)~Vp1) into warning speeds estimated warning speeds VAP at the present vehicle position P0, and can output a signal to the warning device 10 so as to make warning control when the vehicle speed has exceeded the estimated warning speeds VAP. The actual execution of the warning control can be prohibited by a command signal from the control execution judgment section 31.

Estimated warning speeds VAP from the warning judgment output section 32 are calculated as follows: Based on the foregoing expression (30), the relationship between warning speed VA(=VA0β=VAP) at the present vehicle position P0 for a forward node Pβ (distance from Pβ to P0=L1+L2+ . . . +Lβ) and the reference allowable approaching speed VPβ is as follows:

$$VAP=(VP\beta^2+2\cdot(0.5\cdot XgLim)\cdot(L1+L2+ \ldots +L\beta))^{1/2}$$

And, similarly, the relationship between warning speed VA (=VA1β) at the reference node P1 for a forward node P for a forward node Pβ (distance from Pβ to P1=L2+ . . . +Lβ) and the reference allowable approaching speed VPβ is as follows:

$$VA1=(VP\beta 2+2\cdot(0.5\cdot XgLim)\cdot(L2+ \ldots +L\beta))^{1/2}$$

so that from these two expressions, the following expression (32) can be obtained:

$$VAP=(VA1\beta^2+2\cdot(0.5\cdot XgLim))\cdot L1)^{1/2} \qquad (32)$$

The deceleration judgment output section 33 can read the distance L1 between the present vehicle position P0 to node P1 from the data reduction section 25; the allowable deceleration XgLim from the allowable deceleration setting section 28; deceleration speeds VB1β (VB1(n+1)~Vp1) at node P1 from the deceleration speed calculation/memory section 30; and the vehicle speed V from the vehicle speed sensor 5.

Based on the distance L1 and the allowable deceleration XgLim, the deceleration judgment output section 33 transforms the respective deceleration speeds VB1β (VB1(n+1)~Vp1) at node P1 into deceleration speeds (estimated deceleration speeds VBP) at the present vehicle position PO. Then, the deceleration judgment output section 33 compares the estimated deceleration speeds VBP and the vehicle speed, to output a deceleration control command signal to the selection section 34 when the present vehicle speed is faster than the estimated deceleration speeds VBP. The execution of deceleration control can be prohibited by a command signal from the control execution judgment section 31. Furthermore, under deceleration control, the deceleration judgment output section 33 outputs a command signal to set off warnings to the effect (turn-on of lamps, voice generation) from the warning device 10.

The estimated deceleration speed VBP output from the deceleration judgment output section 33 is calculated as follows:

From the foregoing expression (31), the deceleration speed VB(=VB0β=VBP) at the present vehicle position PO for a forward node Pβ distance between PO and Pβ=L1+L2+ . . . +Lβ) and the reference allowable approaching speed VPβ is as follows:

$$VBP=VP\beta^2+2\cdot(0.8\cdot XgLim)\cdot(L1+L2+ \ldots +L\beta))^{1/2}$$

The deceleration speed VB (=VB1β) at the reference node P1 for a forward node Pβ (distance between P1 and Pβ=L2+ . . . +Lβ) and the reference allowable approaching speed VPβ is as follows:

$$VB1\beta=(VP\beta 2+2\cdot(0.8\cdot XgLim)\cdot(L2+ \ldots +L\beta))^{1/2}$$

Therefore, from the above two expressions, the following expression (33) is obtained:

$$VBP=(VB1\beta^2+2\cdot(0.8\cdot XgLim)\cdot L1)^{1/2} \qquad (33)$$

The selection section 34 receives an allowable deceleration XgLim from the allowable deceleration setting section 28 and a command signal of execution (ON) or release (OFF) of deceleration control from the deceleration judgment output section 33. Receiving the command signal of execution of deceleration control, based on the received allowable deceleration XgLim, the selection section 34 selects one of the following control sequences:

1. Supercharging pressure down and fuel cut by engine controller 12
2. Supercharging pressure down, fuel cut and throttle closing by engine controller 12
3. Supercharging pressure down, fuel cut and throttle closing by engine controller 12 and shift down by transmission controller 11
4. Supercharging pressure down, fuel cut and throttle closing by engine controller 12, shift down by transmission controller 11 and braking by brake controller 13

As described, according to the embodiment of the present invention, the judgment output means comprises the warning judgment output section 32, the deceleration judgment output section 33 and the selection section 34.

In this connection, the warning judgment output section 32 transforms the respective warning speeds VA1β (VA1 (n+1)~Vp1) at node P1 into warning speeds (estimated warning speeds VAP) at the present vehicle position P0, and then compares the estimated warning speeds VAP with the present vehicle speed V for judging warning control. Alternatively, warning control may be judged as follows: Estimated is a vehicle speed VAP at the nearest forward node P1 after decelerating in accordance with warning deceleration (0.5·Xglim) from the present vehicle position PO. Then, comparison is made between the estimated speed VAP' and the respective warning speeds VA1β (VA1 (n+1)~Vp1) at node P1. The estimated speed VAP' for this case is expressed as follows:

$$VAP'=(V^2-2\cdot(0.519\ XgLim)\cdot L1)^{1/2}$$

Similarly, the deceleration judgment output section 33 transforms the respective deceleration speeds VB1β (VB1 (n+1)~Vp1) at node P1 into deceleration speeds (estimated deceleration speed VBP) at the present vehicle position P0, and then compares the estimated deceleration speeds VBP with the present vehicle speed V for judging deceleration control. Alternatively, deceleration control may be judged as follows: Estimated is a vehicle speed VBP at the nearest forward node P1 after decelerating in accordance with a deceleration (for deceleration purpose) (0.8·Xglim) from the present vehicle position PO. Then, comparison is made between the estimated speed VBP' and the respective deceleration speeds VB1β (VB1(n+1)~Vp1) at node P1. The estimated speed VBP' for this case is expressed as follows:

$$VBP'=(V^2-2\cdot(0.8\cdot XgLim)\cdot L1)^{1/2}$$

Figure 14:
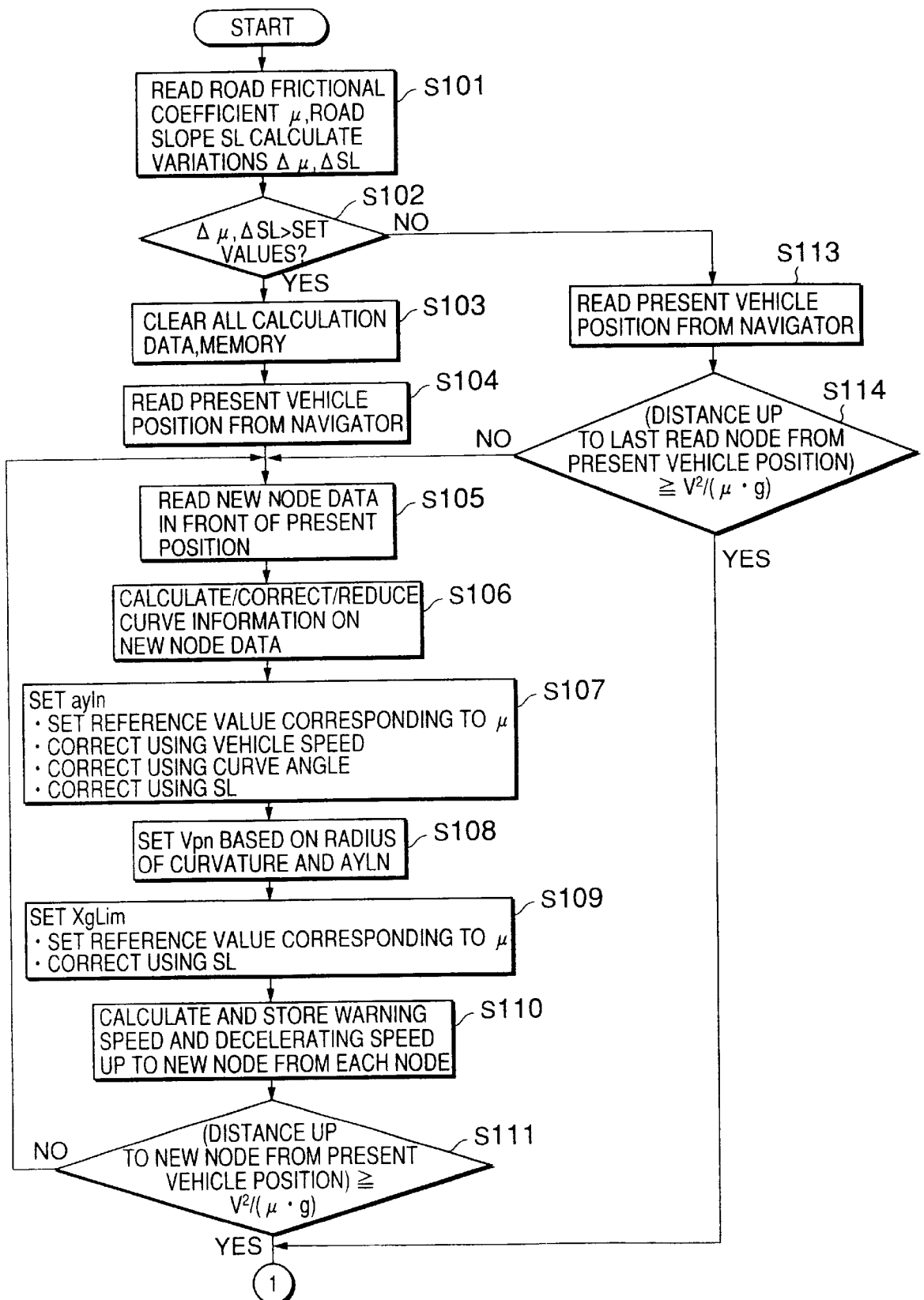
FIG. 14 is a flow chart showing warning/deceleration control.
Figure 15:
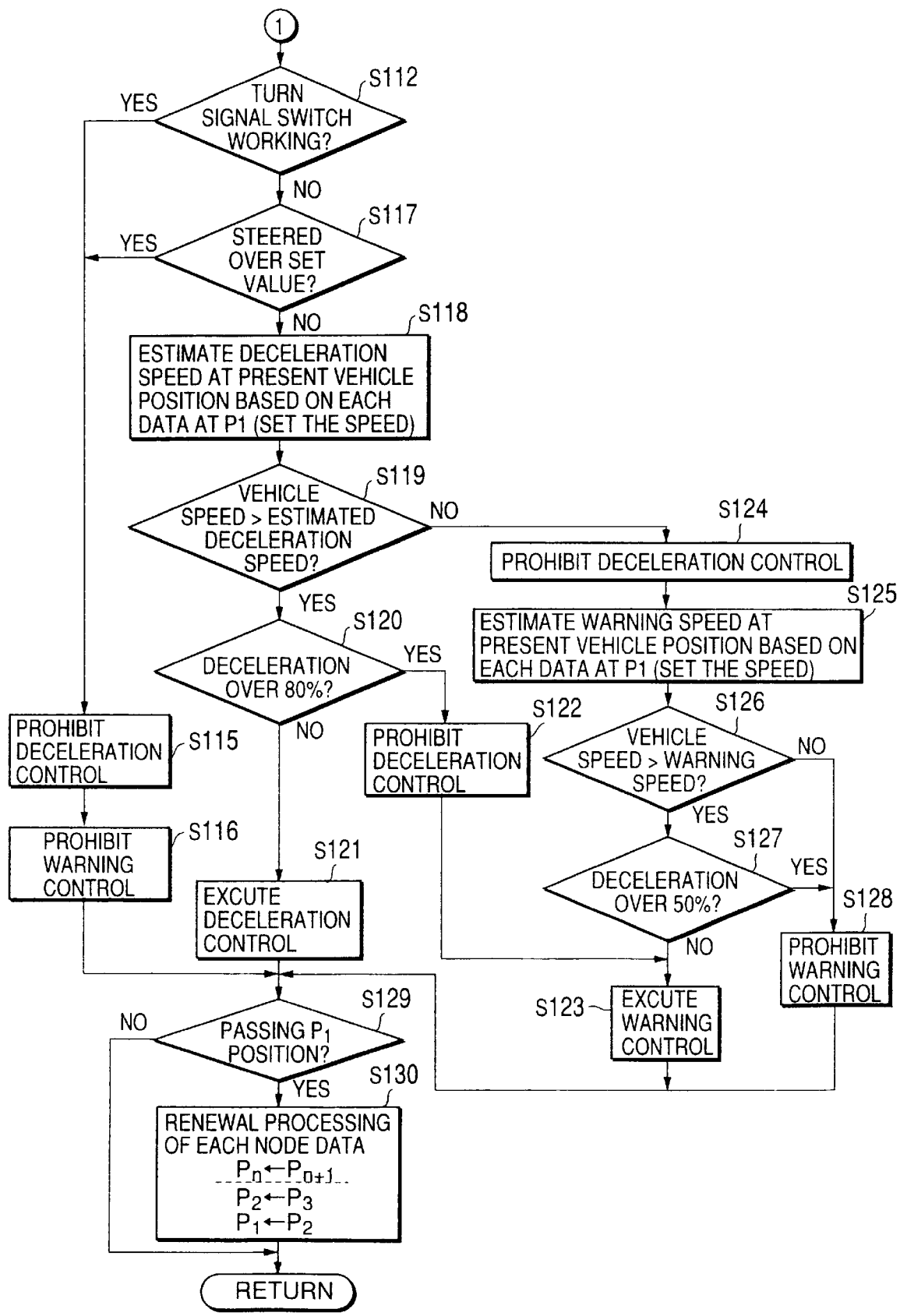
FIG. 15 is a flow chart showing warning/deceleration control following the one of FIG. 14.

Now, the operation of the foregoing configuration of the vehicle maneuvering control device according to the invention will be described, referring to flow charts of the warning/deceleration control shown in FIGS. 14 and 15:

This program is executed for every given interval of time. First, step (hereinafter abbreviated as "S") 101 reads the road surface friction coefficient $\mu$ estimated by the road surface friction coefficient estimation section 22 based on the vehicle speed V, steering angle δf and yaw rate γ, to calculate a change rate $\Delta\mu$, and reads the road slope SL calculated by the road slope estimation section 23 based on the longitudinal acceleration from the longitudinal acceleration sensor 6 and on the vehicle speed change rate for every set time calculated by the vehicle speed change calculator 21, to calculate a change rate ΔSL.

Then at S102, the change rates Δμ and ΔSL are compared with given values set for them. When at least one of them is larger than the given value, that is, when either one has largely changed, it goes to S103 for recalculation, where every calculation data and memory (allowable deceleration XgLim, allowable lateral acceleration ayln, reference allowable approaching speed Vpn, warning speed VA, deceleration speed VB and so on) are cleared. Then, it goes to S104.

S104 reads the present vehicle position P0 from the navigator 8. Then, at S105, new node data ahead of the vehicle, for which allowable deceleration XgLim, allowable lateral acceleration ayln, reference allowable approaching speed Vpn, warning speed VA, and deceleration speed VB have not been calculated yet, are read from the navigator 8 or the memory (in case when the calculation data used have been once cleared on the processor.

Then, it goes to S106. When new node data are read from the navigator 8, based on the new node, the curve geometry detector 24 calculates and corrects the curve information, and the data reduction section 25 reduces the data. Otherwise, when the new node date are read from the memory, the previously calculated curve information in the memory are used.

Then, at S107, the reference value setting section 26a in the allowable lateral acceleration setting section 26 calculates a reference value atlin for the allowable lateral acceleration ayln in accordance with the road surface friction coefficient μ; the vehicle speed correction section 26b corrects (to a corrected value ayl2n) the reference value ayl1n in accordance with the vehicle speed V; the curve angle correction section 26c corrects (to a corrected value ayl3n) the corrected value ayl2n in accordance with the total curve angle θsn and the turning direction of the curve to which node Pn belongs; and the road slope correction section 26d corrects the corrected value ayl3n in accordance with the road slope SL so as to determine the final allowable lateral acceleration ayln.

Then, at S108, the reference allowable approaching speed setting section 27 sets the reference allowable approaching speed Vpn based on the the radius of curvature Rn of the curve given from the data reduction section 25 and the allowable lateral acceleration ayln given from the allowable lateral acceleration setting section 26.

Further, at S109, the allowable deceleration setting section 28 sets a reference value XgLim0 based on the road surface friction coefficient μ in the reference value setting section 28a, and adds a correction value based on the road slope SL to the set reference value XgLim0 to obtain an allowable deceleration XgLim.

At S110, the warning speed calculation/memory section 29 calculates and stores a warning speed VA, based on the allowable deceleration XgLim set by the allowable deceleration speed setting section 28; the reference allowable approaching speed Vpn set by the reference allowable approaching speed setting section 27; and each distance Ln between adjacent nodes Pn−1 and Pn stored in the data reduction section 25.

Furthermore, the deceleration speed calculation/memory section 30 calculates and stores a deceleration speed VB, based on the allowable deceleration XgLim set by the allowable deceleration speed setting section 28; the reference allowable approaching speed Vpn set by the reference allowable approaching speed setting section 27; and each distance Ln between adjacent nodes Pn−1 and Pn stored in the data reduction section 25.

Then, at S111, it is judged whether the distance between the present vehicle point P0 and the foregoing new node is within a forward control range ($V^2/(\mu \cdot g)$ defined to be, e.g., twice the stop distance under $\mu \cdot g$ deceleration as a curve detection range). In the case where it is within the forward control range, it returns to S105, to repeat the foregoing procedure from S105 to S111, that is, to further detect a new node for calculation. In the case where it exceeds the forward control range (that is, all necessary data within the forward control range are acquired), it goes to S112 for further control processing.

At S102, if the change rate Δμ or ΔSL or both of them are smaller than the set values, that is, the road surface friction coefficient μ or the road slope SL is considered to be constant, the data so far stored is used as it is, so that new data is added to the present data. Therefore, proceeding to S113, the present node P0 is read from the navigator 8. Then, S114 judges whether the distance between the present node P0 and the last read node is within the forward control range.

When S114 judges the distance to be within the forward control range, it returns to S105 to follow the above-described procedure from S105 to S111. Otherwise, when S114 judges the distance to be over the forward control range, it goes directly to S112 to make control based on the data already or presently stored.

Step S112 judges whether the turning signal switch 7 has been activated. When YES, it goes to S115 to prohibit (OFF) deceleration control, and then goes S116 to prohibit (OFF) warning control. In other words, when the driver has already activated the turning signal switch 7, presupposing that the driver is getting off the road now running and entering a road not described on the map information of the navigator 8, the presently operated warning/deceleration control is prohibited.

On the other hand, when NO at S112, it goes to S117, where it is judged whether or not the steering amount made by the driver is larger than a preset value based on a signal from the steering angle sensor 3.

When YES, proceeding to S115, deceleration control is prohibited and then proceeding to S116, warning control prohibited.

In other words, presupposing that the driver is making unusual driving, warning/deceleration control is prohibited (OFF).

Otherwise, when NO, that is, the turning signal switch has been turned OFF and steering angle is small, proceeding to S118, the deceleration judgment output section 33 estimates an estimated deceleration speed VBP at the present node P0 based on each data (each deceleration speed VB1β (VB1 (n+1)~Vp1) calculated with reference to node P1.

Then, at S119, the vehicle speed V is compared with the estimated deceleration speed VBP. If the vehicle speed V is over either one of the foregoing estimated deceleration speeds VBP (V≧VBP), it goes to S120.

S120 judges whether the driver has already been made deceleration over the threshold deceleration (0.8·XgLim) based on a signal from the vehicle speed change calculator 21.

When NO, that is, S120 judges deceleration to be needed, it goes to S121 to execute (ON) deceleration control, and then goes to S129.

Otherwise, when YES, that is, S120 judges deceleration to be not needed, it goes to S122 to clear (OFF) deceleration control, and then goes to S123 to execute (ON) warning control (that is, switching deceleration control over to warning control).

On the other hand, If the foregoing comparison made at S119 shows the vehicle speed V becomes lower than all estimated deceleration speeds VBP (V> or =VBP), it goes to S124 to clear (OFF) deceleration control. Then, proceeding to S125, the warning judgment output section 32 estimates the estimated warning speed VAP at the present node P0 based on each data (warning speeds VA1β (VA1(n+1)~Vp1)) calculated with reference to node P1.

At S126, comparison is made between vehicle speed V and each of the estimated warning speeds VAP. If the vehicle speed V exceeds either one of the estimated warning speeds VAP, it goes to S127.

S127 judges whether, receiving a signal from the vehicle speed change calculator 21, the driver has already made deceleration over the threshold deceleration (0.5·XgLim).

When NO, that is, S127 judges warning to be needed, it goes to S123 to execute (ON) warning control, and then goes to S129.

When YES, that is, S127 judges the driver has already made proper response, thus eliminating the need for warning, it goes to S128 to release (OFF) warning control, and then to S129.

As descried above, the warning control execution (ON) to be made at S123 is accomplished by such a warning device as chime, buzzer, voice warning generator, warning light or their combination. The warning control to be performed through S127 is accomplished only by voice warning e.g., "Decelerate for curve", or chime or buzzer sound warning. The warning control to be performed through S122 is accomplished only by, for example, chime or buzzer sound warning.

In the case of the deceleration control execution (ON) at S121, not only such a voice warning as "Decelerate for curve", buzzer set-off and lighting of warning lamps are made, but also a deceleration control will be made by the selection section 34 (to be described later).

The judgment processing at steps S112, S117, S120 and S127 is made by the control execution judgment section 31.

When proceeding from either S116, S121, S123 or S128 to S129, S129 compares the present vehicle position P0 with the node P1. When both positions are judged as essentially identical for traveling, proceeding to S130, stored node data are shifted (e.g., data stored for node P2 is shifted for to be data for node P1, and data stored for node P3 is shifted to be data for node P2), and then the program is terminated.

On the other hand, at S129, when the present vehicle position P0 does not reach the position of node P1, the program is terminated without shifting the node data.

Figure 16:
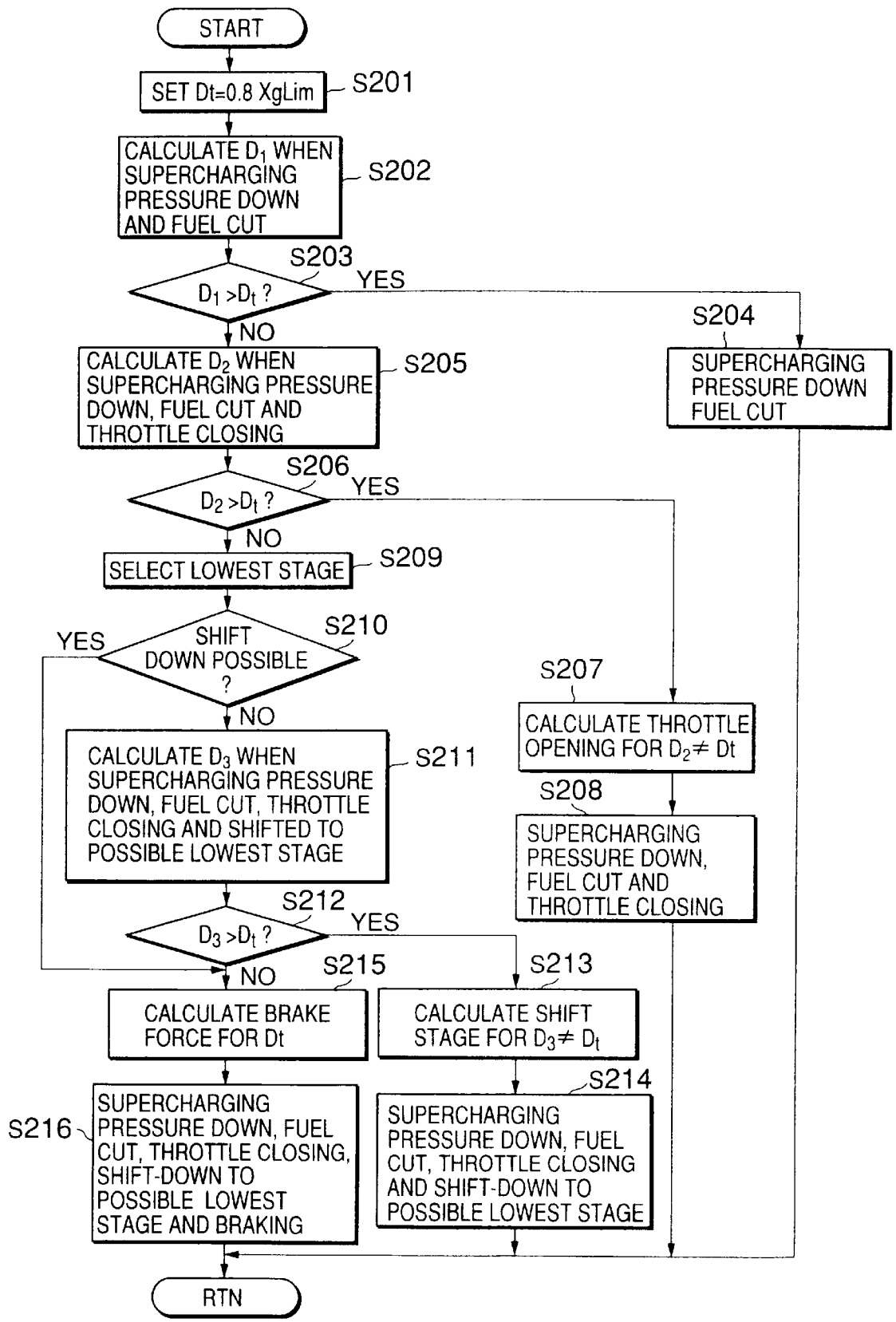
FIG. 16 is a flow chart showing one example of deceleration control.

FIG. 16 is a flow chart showing the program of deceleration control which the selection section 34 carries out when receiving a deceleration control execution signal from the deceleration judgment output device 33:

The program starts when receiving the deceleration control execution signal. First, S201 sets a deceleration Dt which is the target of deceleration. This target deceleration Dt is set to 80% of the allowable deceleration XgLim set by the allowable deceleration setting section 28 (Dt= 0.8·XgLim).

Then, at S202, a deceleration D1 achieved by executing supercharging pressure down and fuel cut by the engine controller 12 is calculated. At S203, comparison between the foregoing target deceleration Dt and the above deceleration D1 is made.

As the result of the comparison made at S203, when the deceleration D1 is larger than the target deceleration Dt (D1>Dt), so that it is judged that the execution of supercharging pressure down and fuel cut can obtain sufficient deceleration. So at S204, the engine controller 12 executes supercharging pressure down and fuel cut to terminate the program.

On the other hand, as the result of the comparison made at S203, when the deceleration D1 is smaller than or equal to the target deceleration Dt (D1≦Dt), so that it is judged that the execution of supercharging pressure down and fuel cut cannot obtain sufficient deceleration, the program goes to S205 for further processing.

Then, S205 calculates a deceleration D2 to be expected when the engine controller 12 executes, in addition to the supercharging pressure down and fuel cut throttle closing. Next, the program goes to S206, where comparison is made between the target deceleration Dt and the above deceleration D2.

As the result of the above comparison at S206, when the deceleration D2 is larger than the target deceleration Dt (D2>Dt), so that it is judged that the execution of supercharging pressure down, fuel cut, and throttle closing can obtain sufficient deceleration, thereby to proceed to S207 where a throttle opening degree which makes the deceleration D2 essentially equal to the target deceleration Dt is calculated. Then, the program goes to S208, where the engine controller 12 executes, in addition to supercharging pressure down, fuel cut, closing control toward the throttle opening degree calculated at S207 to terminate the program.

On the other hand, as the result of the above comparison at S206, when the deceleration D2 is smaller than or equal to the target deceleration Dt (D2≦Dt), so that it is judged that the execution of supercharging pressure down, fuel cut and closing of the throttle cannot obtain sufficient deceleration, the program goes to S209 for further processing.

S209 selects the lowest stage to which gear shift-down can be made by the transmission controller 11, and then the program goes to S210, where it is judged whether the selected gear shift-down is possible.

When the result of the judgment is "YES", the program jumps to S215, while when "NO", the program goes to S211.

Then, S211 calculates a deceleration D3 that is obtained when the engine controller 12 executes supercharging pressure down, fuel cut and closing of the throttle, and the transmission controller 11 executes gear change to the possible lowest stage. Furthermore, the program goes to S212, where the calculated lo deceleration D3 is compared with the target deceleration Dt.

As the result of the comparison at S212, when the deceleration D3 is larger than the target deceleration Dt (D3>Dt), it is judged that the execution of supercharging pressure down, fuel cut, closing of the throttle and gear shift-down can obtain sufficient deceleration, and the program goes to S213 where calculation is made for a gear shift stage which makes the deceleration D3 essentially equal to the target deceleration Dt. Then, the program goes to S214, where not only gear shift-down execution to the calculated gear shift stage is made by the transmission controller 11, but also the execution of supercharging pressure down, fuel cut and closing of the throttle is made by the engine controller 12, to terminate the program.

On the other hand, when the deceleration D3 is smaller than or equal to the target deceleration Dt (D3≦Dt), it is judged that the combinations of supercharging pressure down, fuel cut, closing of the throttle valve and gear shift-down cannot obtain sufficient deceleration, and the program goes to S215 where calculation is made for a brake force (controlled by the brake controller 13) which can attain the target deceleration Dt under the condition of the above execution of supercharging pressure down, fuel cut, closing of the throttle and gear shift-down (using the present shift stage in the case of jump from S210).

Then, at S216, the engine controller 12 executes supercharging pressure down, fuel cut, closing of the throttle valve, the transmission controller 11 executes gear shift-down (using the present selected gear shift stage in the case of jump from S210), and the brake controller 13 executes brake force boosting, to terminate the program.

As described, in the case of deceleration control, since the selection section 34 selects various combinations of supercharging pressure down, fuel cut, closing of the throttle valve (closing control), gear shift-down and brake force boosting in accordance with necessary deceleration degree, thereby eliminating the possibility of excessive deceleration, thus resulting in a natural and proper deceleration.

According to the embodiment of the present invention, since the allowable deceleration setting section 28 sets the reference value XgLim0 in accordance with the actual road surface friction coefficient $\mu$ in the reference value setting section 28a, the road surface friction coefficient $\mu$ can be well incorporated into the control, thus achieving an optimum vehicle maneuvering control.

Furthermore, to determine the allowable deceleration XgLim, the allowable deceleration setting section 28 not only adds a correction for braking distance variance due to road slope SL by its allowable deceleration correction section 28b, but also corrects the reference value XgLim0 so as to have a larger allowable deceleration on a climbing slope and a smaller allowable deceleration on a down slope for a constant driver's sense of deceleration/acceleration, so that this control can be achieved while giving the driver natural sense.

Furthermore, since the allowable lateral acceleration setting section 26 sets the reference value ayl1n in accordance with the road surface friction coefficient $\mu$ by its reference value setting section 26a, the road surface friction coefficient $\mu$ can be well incorporated into the control, thus achieving an optimum vehicle maneuvering control.

Furthermore, since the allowable lateral acceleration setting section 26 corrects the allowable lateral acceleration in accordance with vehicle speed by its vehicle speed correction section 26b, a change in the allowable lateral acceleration in accordance with the vehicle speed is properly corrected, thus resulting in an optimum control.

Furthermore, since the allowable lateral acceleration setting section 26 corrects the allowable lateral acceleration in accordance with the curve angle and the turning direction (left curve, right curve) by its curve angle correction section 26c, an optimum control fully recognizing the difference in forward sighting between left and right curves can be achived when driving on a road having various curving.

Finally, since the allowable lateral acceleration setting section 26 corrects the allowable lateral acceleration in accordance with road slope SL by its road slope correction section 26d, the allowable lateral acceleration in accordance with road slope SL can be properly set, thus resulting in optimum control.

As described above in detail, the vehicle maneuvering control device according to the invention can not only make the optimum control just matching the road condition in a variety of actual roads, but also achive a great deal of benefits allowing natural, practical, reliable and stable maneuvering while taking the effect of the distance up to emerging curves into full consideration.

What is claimed is:

1. A control device for maneuvering a vehicle having a navigation system mounted on said vehicle for deriving positional information thereof and for outputting a positional signal, a pair of camera mounted on said vehicle for detecting road conditions in front of said vehicle and for delivering a road width signal, a vehicle speed sensor mounted on said vehicle for detecting a vehicle speed and for producing a vehicle speed signal, a yaw rate sensor for sensing a yaw rate of said vehicle and for outputting a yaw rate signal, a longitudinal acceleration sensor for detecting an acceleration amount in a running direction of said vehicle and for outputting a longitudinal acceleration signal, a warning device mounted on said vehicle for generating a warning signal to a driver when said vehicle is going into a dangerous running condition, said control device comprising:

vehicle speed changing rate calculating means responsive to said vehicle speed signal for deriving a changing rate of said vehicle speed and for producing a vehicle speed changing rate signal;

road surface coefficient estimating means responsive to said yaw rate signal for predicting a road surface coefficient and for outputting a road surface coefficient signal;

curving condition deciding means responsive to said positional signal and said road width signal for deriving positional data of a curving point where said vehicle is negotiating and for producing a curving condition signal;

road inclination estimating means responsive to said longitudinal acceleration signal for calculating an inclination rate of a road where said vehicle is running and for outputting a road inclination signal;

allowable deceleration setting means responsive to said road surface coefficient signal and said road inclination signal for deciding an optimum deceleration rate so as to safely pass along said road and for generating an allowable deceleration rate signal;

allowable lateral acceleration setting means responsive to said road surface coefficient signal, said vehicle speed signal, said curving condition signal and said road inclination signal for deciding a lateral acceleration rate so as to safely pass along said road and for generating an allowable lateral acceleration rate signal;

allowable approaching speed setting means responsive to said curving condition and said allowable lateral acceleration rate signal for deciding an allowable approaching speed into said road on a basis of a curvature radius of said road and for producing an allowable approaching speed signal;

warning speed calculating means responsive to said allowable deceleration rate signal and said allowable approaching speed signal for calculating a warning speed based upon a distance between said vehicle and said road and for generating a warning speed signal;

deceleration rate calculating means responsive to said allowable deceleration rate signal and said allowable approaching speed signal for calculating a deceleration rate so as to perform an optimum control to safely and reliably pass said road by sufficiently taking into consideration of said distance; and deceleration means for decelerating said vehicle speed based on said deceleration rate.

2. The control device according to claim 1, wherein:
said allowable lateral acceleration setting means further includes means for adjusting said lateral acceleration rate based on said vehicle speed.

3. The control device according to claim 1, wherein:
said allowable lateral acceleration setting means further includes means for adjusting said lateral acceleration rate based on an angle of curve.

4. The control device according to claim 1, wherein:
said allowable lateral acceleration setting means further includes means for adjusting said lateral acceleration rate based on a direction in which said vehicle turns.

5. A control device for maneuvering a vehicle, comprising:
vehicle running condition detecting means for detecting a vehicle running condition including a vehicle running speed;
a navigation system for detecting a current vehicle position and for storing road map data including node data representing a position of a road;
curve detection means for detecting a curve of the road and calculating curve data including a distance between said current vehicle position and said curve, a radius of curvature and an angle of said curve based on said node data;
road surface friction coefficient estimating means for estimating road surface friction coefficient based on said vehicle running condition;
allowable deceleration calculating means for calculating an allowable deceleration which said vehicle can decelerate based on said friction coefficient;
allowable lateral acceleration calculating means for calculating an allowable lateral acceleration by which said vehicle can safely pass through said curve based on said friction coefficient;
allowable approaching speed calculating means for calculating an allowable approaching speed by which said vehicle can safely pass through said curve based on said radius and said allowable lateral acceleration;
warning judging speed calculating means for calculating a warning judging speed to judge whether a warning control for warning to a driver should be executed or not based on said distance, said allowable deceleration speed and said allowable approaching speed;
deceleration judging speed calculating means for calculating a deceleration judging speed to judge whether a deceleration control for decelerating said vehicle running speed should be executed based on said distance, said allowable deceleration speed and said allowable approaching speed; and
controlling means for warning the driver when said present vehicle speed is higher than said warning judging speed and for decreasing said vehicle speed when said vehicle speed is higher than said deceleration judging speed.

6. The control system according to claim 5, further comprising:
road slope degree calculating means for calculating road slope degree based on said vehicle running condition;
wherein said allowable deceleration speed calculating means corrects said allowable deceleration speed based on said road slope degree.

7. The control system according to claim 5, further comprising:
road slope degree calculating means for calculating road slope degree based on said vehicle running condition;
wherein said allowable lateral acceleration calculating means corrects said allowable lateral acceleration based on said road slope degree.

8. The control system according to claim 5, wherein:
said allowable lateral acceleration calculating means further includes means for correcting said allowable lateral acceleration based on said vehicle running speed.

9. The control system according to claim 5, wherein
said allowable lateral acceleration calculating means includes means for correcting said allowable lateral acceleration based on said angle of curve.

10. The control system according to claim 5, further comprising:
road slope degree calculating means for calculating road slope degree based on said vehicle running condition;
wherein said allowable lateral acceleration calculating means includes
road slope correcting means for correcting said allowable lateral acceleration based on said road slope degree;
vehicle running speed correcting means for correcting said allowable lateral acceleration based on said vehicle running speed; and
curve angle correcting means for correcting said allowable lateral acceleration based on said curve angle.

11. The control system according to claim 5, further comprising:
road configuration detecting means for obtaining road configuration data including road width through images of the road taken by the cameras,
wherein said curve detection means modifies the curve data based on said road configuration data.

12. The control system according to claim 5, further comprising:
change rate detecting means for detecting change rate of at least said friction coefficient of the road,
wherein when said change rate detected by said change rate detecting means is a lower than a predetermined value, previously calculated values of allowable deceleration, said allowable lateral acceleration and said allowable approaching speed are used to calculate said warning judging speed and said deceleration judging speed.

13. The control system according to claim 5, further comprising:
means for prohibiting said deceleration control and said warning control when a turning signal switch has been activated.

14. The control system according to claim 5, further comprising:
means for prohibiting said deceleration control and said warning control when said steeling angle is larger than a predetermined value.

15. The control system according to claim 5, further comprising:
data reduction means for reducing said curve data by selecting necessary curve data to calculate said allowable lateral acceleration, said allowable approaching speed, said warning judging speed and said deceleration judging speed based on a curve geometry, a curve direction and a distance between curves.

16. A control device for maneuvering a vehicle, comprising:
vehicle running condition detecting means for detecting vehicle running condition including a vehicle running speed;
navigation system for detecting a current vehicle position and for storing road map data including node data representing a position of road;
curve geometry detector for calculating curve data including a radius of curvature, curve direction and a distance between said curves based on said node data;

data reduction means for reducing said curve data by selecting necessary curve data based on said curvature, said curve direction and said distance between curves;

warning and decelerating control judging means for judging whether warning control for warning to driver should be executed and for judging whether decelerating control for decelerating said vehicle running speed should be executed based on said vehicle condition and said selected curve data; and means for warning the driver based on output from said warning and decelerating judging means, and for decelerating said vehicle based on output from said warning and decelerating judging means.

17. The control system according to claim 16, wherein:

said reduction means determines said curve data as unnecessary curve data when the execution of said warning and decelerating control based on said curve data is absorbed by the execution of said warning and decelerating control based on the other curve data.

* * * * *